United States Patent
Cattle

(10) Patent No.: US 11,435,471 B2
(45) Date of Patent: Sep. 6, 2022

(54) IMAGING USING FREQUENCY-SCANNED RADAR

(71) Applicant: KMB Telematics, Inc., Woodinville, WA (US)

(72) Inventor: Bryan Cattle, Woodinville, WA (US)

(73) Assignee: KMB Telematics, Inc., Arlington, VA (US)

( * ) Notice: Subject to any disclaimer, the term of this patent is extended or adjusted under 35 U.S.C. 154(b) by 792 days.

(21) Appl. No.: 16/391,215

(22) Filed: Apr. 22, 2019

(65) Prior Publication Data

US 2019/0324134 A1 Oct. 24, 2019

Related U.S. Application Data

(60) Provisional application No. 62/826,269, filed on Mar. 29, 2019, provisional application No. 62/661,167, filed on Apr. 23, 2018.

(51) Int. Cl.

| | |
|---|---|
| *G01S 13/89* | (2006.01) |
| *G01S 13/42* | (2006.01) |
| *G01S 13/931* | (2020.01) |
| *G01S 7/03* | (2006.01) |
| *G01S 7/02* | (2006.01) |
| *H01Q 13/10* | (2006.01) |
| *G01S 7/41* | (2006.01) |
| *H01Q 13/20* | (2006.01) |
| *H01Q 3/22* | (2006.01) |

(52) U.S. Cl.
CPC ............ *G01S 13/89* (2013.01); *G01S 7/024* (2013.01); *G01S 7/032* (2013.01); *G01S 7/411* (2013.01); *G01S 13/426* (2013.01); *G01S 13/931* (2013.01); *H01Q 3/22* (2013.01); *H01Q 13/10* (2013.01); *H01Q 13/206* (2013.01)

(58) Field of Classification Search
CPC .......... G01S 13/89; G01S 7/024; G01S 7/032; G01S 7/411; G01S 13/426; G01S 13/931; H01Q 3/22; H01Q 13/10; H01Q 13/206
See application file for complete search history.

(56) References Cited

U.S. PATENT DOCUMENTS

2020/0200866 A1* 6/2020 Lynch ..................... G01S 13/89

FOREIGN PATENT DOCUMENTS

CN 106291477 A * 1/2017 ............... G01S 7/28

* cited by examiner

*Primary Examiner* — Matthew M Barker
(74) *Attorney, Agent, or Firm* — Polsinelli PC

(57) ABSTRACT

Antennas oriented at a first orientation toward an area of interest can transform radar signals through a first transformation that physically maps the plurality of radar signals with a plurality of unique beam angles corresponding to a plurality of unique frequencies. Antennas oriented at a second orientation toward the area of interest can transform radar signals through a second transformation completing the first transformation. A frequency scan can be performed on a first plurality of responses to first radar signals to identify first spatial data along a first dimension. Second spatial data at second spatial location along a second dimension can be created from a second plurality of responses corresponding to the second transformation. An image can be generated using the first spatial data and the second spatial data while a range value of the area of interest can be determined using the first plurality of responses.

31 Claims, 23 Drawing Sheets

FIG. 4E
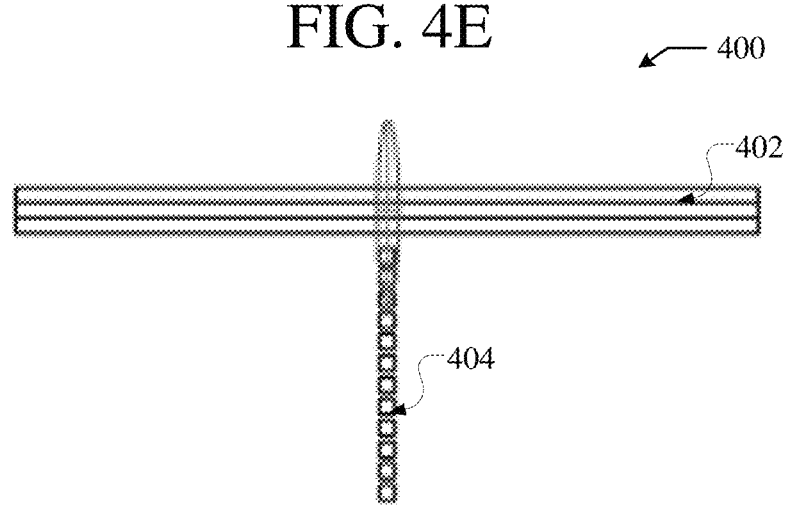
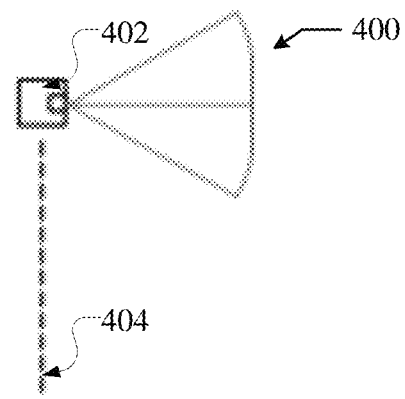
FIG. 4F

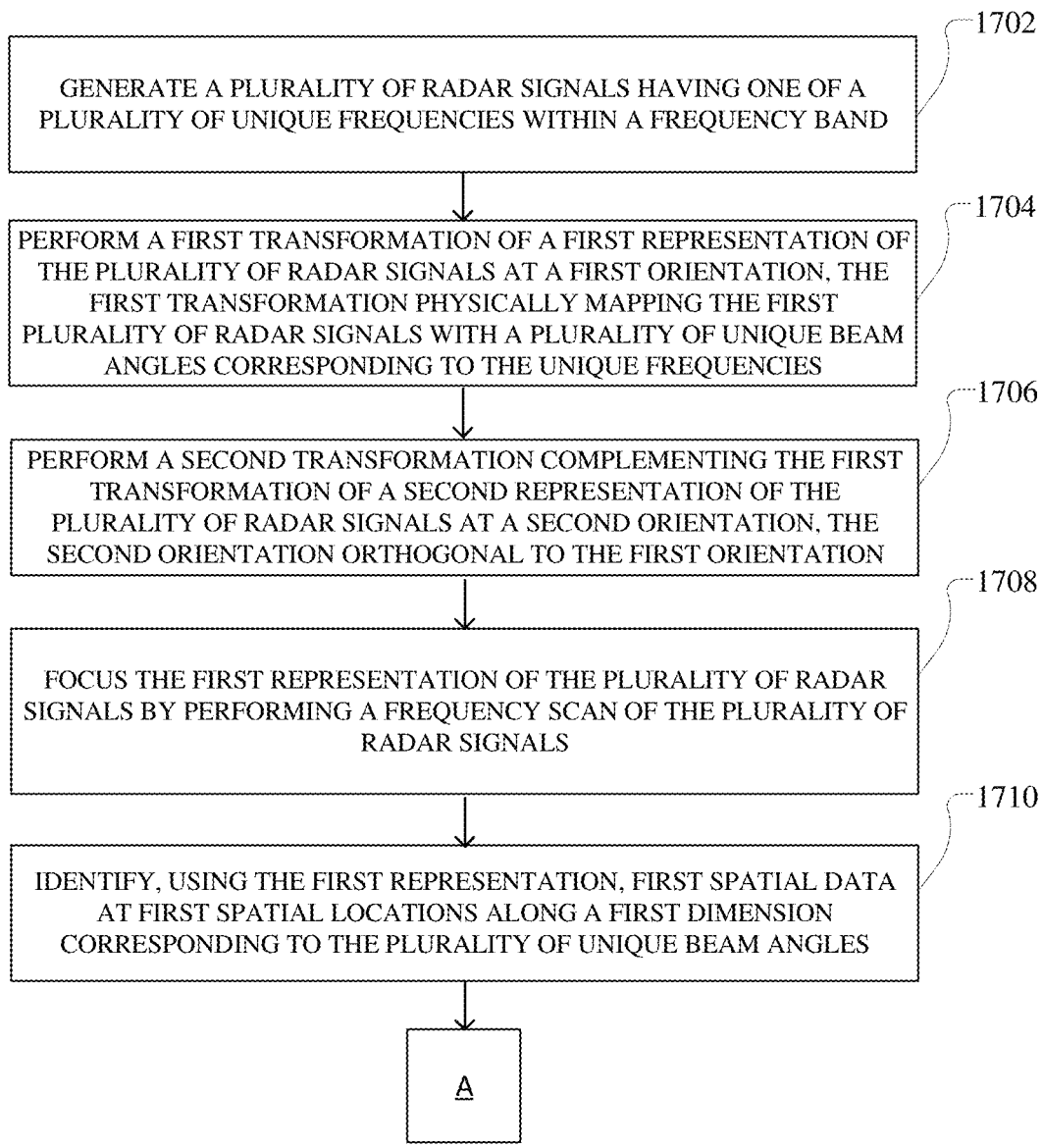

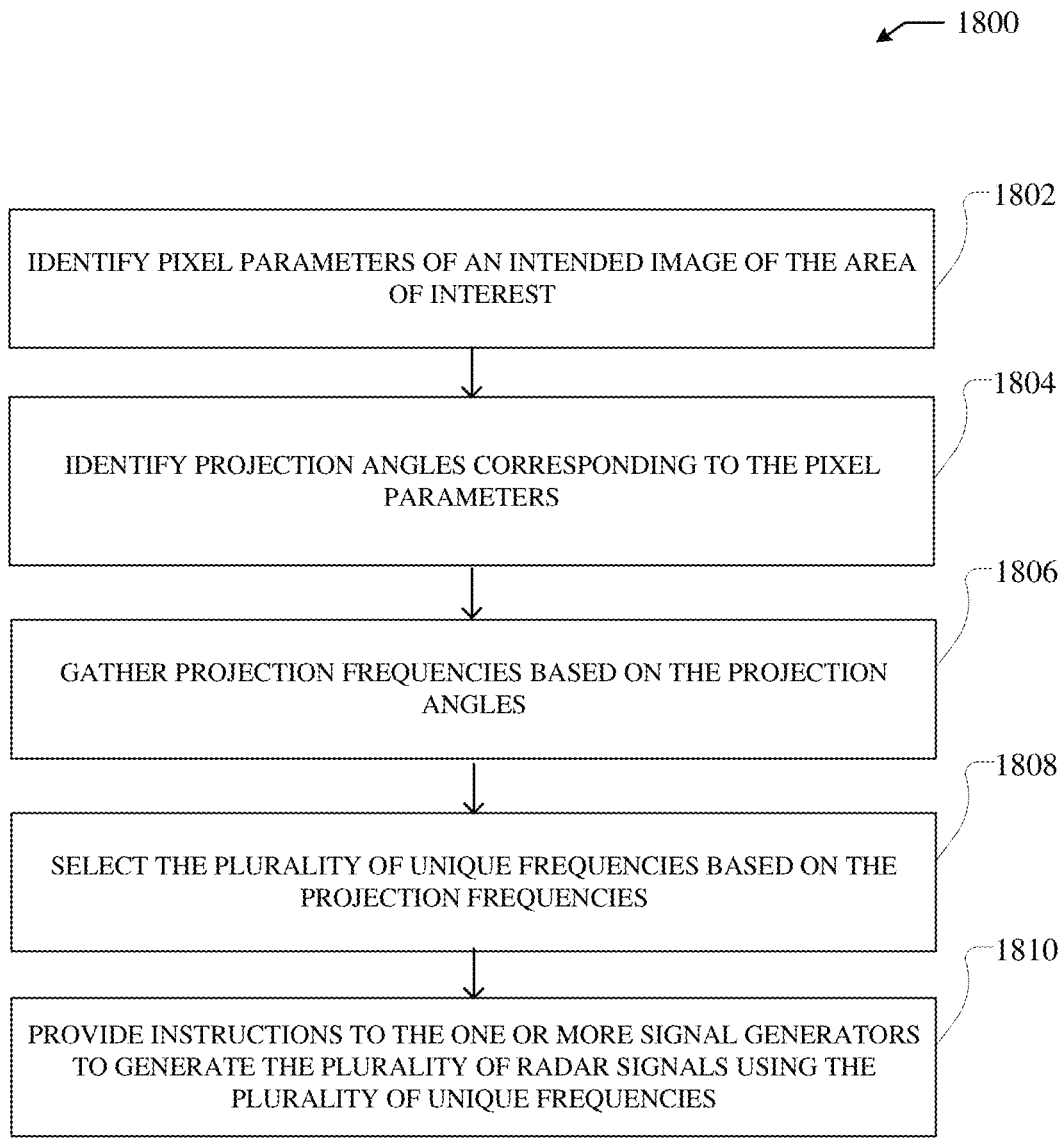

IMAGING USING FREQUENCY-SCANNED RADAR

RELATED APPLICATIONS

This application claims the benefit of U.S. Application No. 62/661,167, filed Apr. 23, 2018, entitled "Systems and Methods for Low Cost Intelligent Machine Sensor Using Frequency Scanned Radiolocation", and U.S. Application No. 62/826,269, filed Mar. 29, 2019, entitled "Imaging Using Frequency-Scanned Radar", both of which are incorporated by reference in their entirety.

TECHNICAL FIELD

The technical field relates to radar imaging systems and methods, and more particularly to systems and methods for high resolution radar imaging using frequency-scanned radar.

BACKGROUND

Advances in technology have allowed for increasingly accurate high resolution 3D scene detection and recognition within a field of view. In particular, advances in technology have allowed for increasingly accurate 3D object sensing within one or more fields of view. In turn, this has led to advances in numerous fields. One such field is the vehicle field. For example, improvements in object sensing have led to advances in collision detection, thereby resulting in safer cars and drones. In another example, improvements in object sensing have led to the development of autonomous cars and drones.

Currently, lidar and computer vision techniques have been used to perform object sensing. In particular, lidar and computer vision techniques are common techniques that have been used to perform high resolution 3D scene detection and recognition. However systems that use lidar and computer vision for 3D scene detection and recognition have many drawbacks. Specifically, the frequency ranges of electromagnetic energy used by lidar and computer vision systems degrade performance of such systems in certain environments and operational scenarios. For example, lidar and computer vision systems have difficulty sensing performing high resolution 3D scene detection in fog and rain. Further, lidar and computer vision systems are able to identify some scattering properties of objects in an environment, but are unable to identify enough meaningful scattering properties of objects for performing 3D scene detection and recognition. In turn, lidar and computer vision systems are unable to determine characteristics of an object, e.g. a material composition of the object in performing 3D scene detection and recognition. Additionally, lidar and computer vision systems are unable to identify an instantaneous velocity of a detected object, e.g. for purposes of controlling an automobile based on the velocity of the object. Further, lidar and computer vision object detection systems are unable to detect velocities of objects that are moving slowly (e.g., those moving slowly relative to a fixed frame and/or the velocity of the automobile). While it would be desirable to perform high resolution 3D scene detection and recognition that improves upon and/or solves one or all of the previously mentioned deficiencies of using lidar and computer vision to perform object sensing, existing systems and methods do not do so.

Further, lidar and computer vision techniques have many deficiencies in actual implementation in systems for performing high resolution 3D scene detection and recognition. Specifically, lidar systems have many moving parts that make such systems prone to failure. Lidar systems utilize expensive components that make such systems difficult for widespread implementation. Additionally, computer vision systems are difficult to calibrate making such systems difficult to operate. There therefore exist needs for systems for performing high resolution 3D scene detection and recognition that improve upon or solve one or all of the previously mentioned deficiencies of current lidar and computer vision systems.

Radar is the use of radio waves to estimate the properties of a channel. This channel begins at a transmitter, extends into a field of view, potentially including one or more radio wave scatterers, and ends at a receiver. In order to obtain high resolution images, e.g. 3D scene detection and recognition, specific properties of the channel can be measured through radar. Examples of such properties include propagation delay (the distance to a scatterer), Doppler frequency shift (the relative velocity of a scatterer), the attenuation of the signal experienced in the channel, and the polarity transformation affected by scatterers in the channel. Further, in a channel, signals reflected by scatterers combine linearly. Therefore, to take meaningful measurements it is desirable to probe the fewest possible scatterers at any given time or over any given time window. High resolution radar imaging can be used to probe the fewest possible scatters for obtaining accurate images of a field of view through radar.

Current vehicular radar imaging system, e.g. used in automobiles and drones, have been limited to small aperture systems that are used for forward collision avoidance, adaptive cruise control, and blind spot detection. A small aperture system has by definition a wide beamwith, thereby affecting the resolution within a field of view. These typically offer a limited scanning range if any, and a limited number of targets that can be detected. There therefore exist needs for improved systems and methods for performing 3D high resolution imaging in a field of view using radar imaging.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not, therefore, to be considered to be limiting of its scope, the principles herein are described and explained with additional specificity and detail through the use of the accompanying drawings in which:

FIG. 4E shows a front perspective view of the antenna arrangement 400 with a first set of antennas in a transmitting configuration in accordance with some embodiments.

FIG. 4F shows a side perspective view of the antenna arrangement 400 with the first set of antennas in a transmitting configuration in accordance with some embodiments.

FIGS. 17A and 17B illustrates an example method for performing frequency-scanned radar imaging in accordance with some embodiments.

FIG. 18 illustrates an example method for controlling frequency-scanning as part of performing frequency-scanned radar imaging in accordance with some embodiments.

DESCRIPTION OF EXAMPLE EMBODIMENTS

Figure 1:
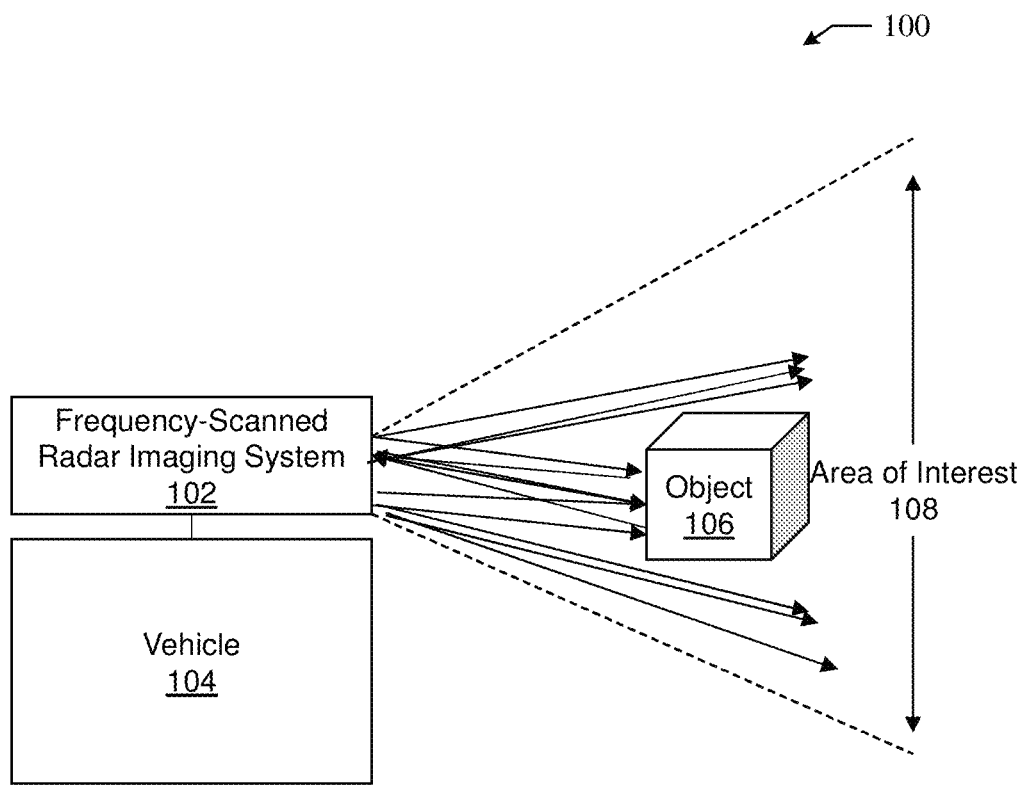
FIG. 1 illustrates an example system 100 of a frequency-scanned radar imaging system in accordance with some embodiments.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Systems, methods, and computer-readable media are for high resolution radar imaging using frequency-scanned radar. The systems, methods, and computer-readable media described herein can utilize a large-aperture frequency-scanned antenna for performing radar imaging. Such large-aperture frequency-scanned antennas can be manufactured using manufacturing methods and materials to reduce the overall costs of the antennas. Further, the systems, methods, and computer-readable media described herein can use narrowband ranging techniques that can resolve range with high precision using a narrowband transmitted waveform. Additionally, the system, methods, and computer-readable media described herein can use Doppler processing to image moving targets, e.g. using narrowband ranging techniques. The systems, methods, and computer-readable media described herein can generate images from multiple snapshots recorded by a receive antenna array based on transmissions from a plurality of transmitters. Further, the systems, methods, and computer-readable media described herein can utilize calibration techniques for accurately identifying relative phases and amplitudes of array elements operating to perform high resolution radar imaging. Specifically, the systems, methods, and computer-readable media described herein can account for misalignment of the arrays, e.g. introduced during manufacturing, by using calibration techniques to accurately identify relative phases and amplitudes of the array elements. Additionally, the systems, methods, and computer-readable media described herein can utilize calibration methods to precisely identify positions of elements in one or more transmitting and receiving arrays to account for vibrations of the arrays during operation, e.g. as the arrays move while being mounted on a vehicle. The systems, methods, and computer-readable media described herein can utilize calibration techniques that facilitate high precision radar imaging for long periods of time over full temperature ranges of applications, e.g. automotive temperature ranges. Further, the systems, methods, and computer-readable media described herein can utilize receive antenna arrays that are capable of measuring changes in one or more polarization vectors of reflected radiation within a channel. Additionally, the systems, methods, and computer-readable media described herein can utilize signal processing techniques for rejecting clutter and minimizing the impact of multipath interference.

The systems, methods and, computer-readable media described herein can be configured for automotive and airborne collision detection and avoidance. While the systems, methods, and computer-readable media discussed herein are described with respect to automotive applications and airborne applications, in various embodiments, the systems, methods, and computer-readable media can be used with an applicable application that utilizes radar imaging. Specifically, the systems, methods, and computer-readable media described here can be used not only in automotive collision detection/avoidance systems and autonomous vehicular systems, but also in systems that use physical properties of remote objects for capturing traffic or other conditions.

In certain embodiments, a frequency-scanned radar imaging system can include one or more signal generators configured to generate a plurality of radar signals. The plurality of radar signals can be generated based on one or more reference signals having one of a plurality of frequencies within a frequency band. The frequency-scanned radar imaging system can also include first one or more antennas oriented in a first orientation toward an area of interest configured to perform a first transformation of a first representation of the plurality of radar signals. The first transformation can physically map the plurality of radar signals with a plurality of unique beam angles corresponding to the plurality of unique frequencies. Further, the frequency-scanned radar imaging system can include second one or more antennas in a second orientation toward the area of interest that is orthogonal to the first orientation. The second one or more antennas can be configured to perform a second transformation of a second representation of the plurality of radar signals completing the first transformation. Additionally, the frequency-scanned radar imaging system can include a first focusing module configured to focus the first representation of the first plurality of radar signals by performing a frequency scan of the plurality of responses. The first focusing module can also be configured to identify first spatial data at first spatial locations along a first dimension corresponding to the unique beam angles using the first representation. Further, the frequency-scanned radar imaging system can include a second focusing module configured to focus the second representation of the plurality of radar signals. The second focusing module can also be configured to identify second spatial data at second spatial locations along a second dimension distinct from the first dimension using the second representation. The frequency-scanned radar imaging system can also include a range determination module configured to identify a range value of the area of interest using the first representation or the second representation of the plurality of radar signals. Additionally, the frequency-scanned radar imaging system can include an image formation module configured to form one or more images of the area of interest using the first spatial data for a first resolution along the first orientation and the second spatial data used for a second resolution along the second orientation.

In various embodiments, a method for performing frequency-scanned radar imaging comprises generating a plurality of radar signals. The plurality of radar signals can be generated based on one or more reference signals having one of a plurality of frequencies within a frequency band. The method can also include performing a first transformation of a first representation of the plurality of radar signals at a first orientation. The first transformation can physically map the plurality of radar signals with a plurality of unique beam angles corresponding to the plurality of unique frequencies. Further, the method can include performing a second transformation of a second representation of the plurality of radar signals completing the first transformation. The second transformation can be performed at a second orientation orthogonal to the first orientation. Additionally, the method can include focusing the first representation of the first plurality of radar signals by performing a frequency scan of the plurality of responses. The method can also include identifying first spatial data at first spatial locations along a first dimension corresponding to the unique beam angles using the first representation. Further, the method can include focusing the second representation of the plurality of radar signals. The method can also include identifying second spatial data at second spatial locations along a second dimension distinct from the first dimension using the second representation. Additionally, the method can include identifying a range value of the area of interest using the first representation or the second representation of the plurality of radar signals. Further, the method can include forming one or more images of the area of interest using the first spatial data for a first resolution along the first orientation and the second spatial data used for a second resolution along the second orientation.

In certain embodiments, a frequency-scanned radar imaging system can include one or more signal generators configured to generate a plurality of radar signals. The plurality of radar signals can be generated based on one or more reference signals having one of a plurality of frequencies within a frequency band. The frequency-scanned radar imaging system can also include first one or more antennas oriented in a first orientation toward an area of interest configured to perform a first transformation of a first representation of the plurality of radar signals. The first transformation can physically map the plurality of radar signals with a plurality of unique beam angles corresponding to the plurality of unique frequencies. Further, the frequency-scanned radar imaging system can include second one or more antennas in a second orientation toward the area of interest that is orthogonal to the first orientation. The second one or more antennas can be configured to perform a second transformation of a second representation of the plurality of radar signals completing the first transformation. Further, the frequency-scanned radar imaging system can include one or more first Monolithic Microwave Integrated Circuits (MMICs) coupled to the first one or more antennas and configured to process the first transformation. The frequency-scanned radar imaging system can also include one or more second MMICs coupled to the second one or more antennas and configured to process the second transformation. Additionally, the frequency-scanned radar imaging system can include a first focusing module configured to focus the first representation of the first plurality of radar signals by performing a frequency scan of the plurality of responses. The first focusing module can also be configured to identify first spatial data at first spatial locations along a first dimension corresponding to the unique beam angles using the first representation. Further, the frequency-scanned radar imaging system can include a second focusing module configured to focus the second representation of the plurality of radar signals. The second focusing module can also be configured to identify second spatial data at second spatial locations along a second dimension distinct from the first dimension using the second representation. The frequency-scanned radar imaging system can also include a range determination module configured to identify a range value of the area of interest using the first representation or the second representation of the plurality of radar signals. Additionally, the frequency-scanned radar imaging system can include an image formation module configured to form one or more images of the area of interest using the first spatial data for a first resolution along the first orientation and the second spatial data used for a second resolution along the second orientation.

DESCRIPTION

The disclosed technology addresses the various technical needs, including one or more technical needs in the art for improved radar imaging. The present technology involves systems, methods, and computer-readable media for performing radar imaging using frequency-scanning. These systems include hardware, software, and/or firmware, examples of which are disclosed at length herein.

FIG. 1 illustrates an example system 100 of a frequency-scanned radar imaging system in accordance with some embodiments. The system 100 includes a frequency-scanned radar imaging system 102, a vehicle 104, an object 106, and a field of view/area of interest 108.

The frequency-scanned radar imaging system 102 functions to use radar techniques to perform high resolution imaging of the area of interest 108. Specifically, the frequency-scanned radar imaging system 102 can implement frequency-scanned radar techniques to image the object 106 in the area of interest 108. Further, the frequency-scanned radar imaging system 102 can implement frequency-scanned radar techniques to estimate properties of a channel, including scatterer(s), e.g. remote scatterer(s) in a channel. The frequency-scanned radar imaging system 102 is implemented as part of a vehicle 104. The vehicle 104 can be a land-based vehicle, e.g. an automobile, or an aerial-based vehicle, e.g. a drone.

As discussed previously, radar is the use of radio waves to estimate the properties of a channel. This channel begins at a transmitter, extends into a field of view, potentially including one or more radio wave scatterers, and ends at a receiver. In order to obtain high resolution images, e.g. 3D scene detection and recognition, specific properties of the channel can be measured through radar. Examples of such properties include propagation delay (the distance to a scatterer), Doppler frequency shift (the relative velocity of a scatterer), the attenuation of the signal experienced in the channel, and the polarity transformation affected by scatterers in the channel. Further, in a channel, signals reflected by scatterers combine linearly. Therefore, to take meaningful measurements it is desirable to probe the fewest possible scatterers at any given time or over any given time window. High resolution radar imaging can be utilized by the frequency-scanned radar imaging system 102 to probe the fewest possible scatters for obtaining accurate images of a field of view through radar.

A large antenna aperture can be used to achieve high resolution radar imaging. However, since a large antenna aperture produces a narrow beam, mechanisms are desired for steering the beam to examine a useful field of view. Electronically-scanned antennas can be used to produce a beam through a large antenna aperture while still retaining the ability to steer the beam to examine a field of view. In particular, phased array radars with electronic or mechanical beam scanning can be used to steer a beam through a large aperture to examine a useful field of view. In a phased array, a series of transmit antennas in an array can be fed replicas of the same transmit signal shifted by a constant phase shift. Once transmitted, the replicas of the transmit signal sum constructively to produce a beam that propagates in a direction of interest. By changing the phase shift between the antennas, the direction of propagation can be controlled, effectively creating a steerable beam through a process known as beamforming.

Beamforming can be realized by the fact that there is an equal, controllable phase shift between a plurality of radiating antenna elements capable of transmitting the same signal. A constant phase shift between radiating elements can be realized through various signal processing techniques. Another way to create a constant phase shift between radiating elements is to insert a constant length of transmission line between those elements and vary the input frequency. As the input frequency changes, the wavelength changes. Changing the wavelength of a wave passing through a fixed length of transmission line will change the phase of the wave at the output of that transmission line.

This phase shift between adjacent elements can produce the beamforming effect that scans the transmitted beam. This technique is known as frequency-scanning and can efficiently be used to perform beamforming.

Frequency-scanned antennas are simple to implement, reliable, and have a low cost. As discussed previously, some of the deficiencies of current lidar and computer vision imaging systems are reliability, difficulty in operation and implementation, and cost. Therefore, frequency-scanning antennas and frequency-scanning imaging techniques can overcome the current deficiencies of current lidar and computer vision imaging systems. However, frequency-scanned antennas and imaging techniques do have some drawbacks. Specifically, range detection using narrow bandwidth is often needed in frequency-scanned antenna systems. The frequency-scanned radar imaging system 102 can apply frequency-scanned radar imaging techniques to overcome these problems. Specifically, the frequency-scanned radar imaging system 102 can use a frequency scanned-antenna and a narrowband ranging algorithm to perform high resolution imaging. Further, the frequency-scanned radar imaging system 102 can be implemented using new low-cost antenna manufacturing methods, thereby lowering the overall costs of performing high resolution radar imaging.

As discussed previously, current vehicular radar imaging system, e.g. used in automobiles and drones, have been limited to small aperture systems that are used for forward collision avoidance, adaptive cruise control, and blind spot detection. These typically offer a limited angular field of view, limited scanning range if any, and a limited number of targets that can be detected, thereby affecting the resolution within a field of view. To overcome these issues, the frequency-scanned radar imaging system 102 can generate a full 3D image with potentially millions of pixels. This is advantageous over current automotive radars that essentially produce "1 pixel" of a full 3D image. Further, the frequency-scanned radar imaging system 102 can generate high resolution images using radar at much lower cost than currently available systems. Additionally, the frequency-scanned radar imaging system 102 can measure the scattering properties of remote objects using radar, which can be used to determine material properties of the remote objects.

Figure 2:
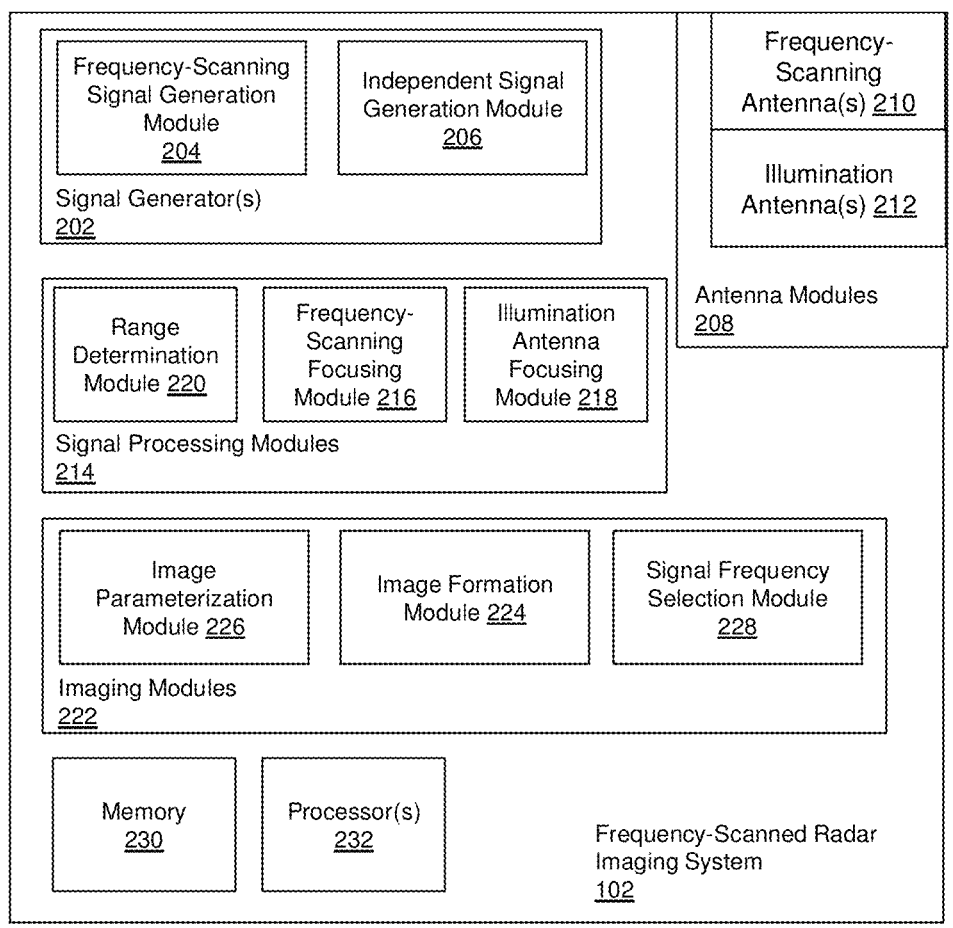
FIG. 2 shows an example frequency-scanned radar imaging system in accordance with some embodiments.

FIG. 2 shows an example frequency-scanned radar imaging 102. The frequency-scanned radar imaging system 102 includes signal generator(s) 202, antenna modules 208, signal processing modules 214, imaging modules 222, a memory 230, and processor(s) 232.

The signal generator(s) 202 includes a frequency-scanning signal generation module 204 and an independent signal generator module 206. The frequency-scanning signal generation module 204 and the independent signal generator module 206 function to generate a plurality of radar signals within a frequency band. The frequency-scanning signal generation module 204 and the independent signal generator module 206 can generate the plurality of radar signals based on one or more reference signals. For example, the frequency-scanning signal generation module 204 and the independent signal generator module 206 can generate the plurality of radar signals based on one or more reference signals generated using a waveguide.

The independent signal generator module 206 functions to generate, at least in part, a plurality of radar signals that are independent from each other. Specifically, the independent signal generator module 206 can generate and transmit, along with one or more antennas, truly independent radar signals. Truly independent signals can be signals that are separated in time, space, code, polarization, or frequency. Further, truly independent signals can be signals that are not just phase-shifted replicas of the same signal. As will be discussed in greater detail later, independent signals can be used to implement a multiple-input multiple-output (MIMO) frequency-scanned radar imaging system 102.

The antenna modules 208 function to transmit and receive radar signals. Specifically, the antenna modules 208 can transmit and receive radar signals as part of performing high resolution imaging of an area of interest using frequency-scanned radar. The antenna modules 208 can transform radar signals. Specifically, the antenna module 208 can perform transformations, e.g. different transformations, of representations, e.g. different representations, of a plurality of radar signals. Transforming radar signals, as used herein, can include either transmitting or receiving radar signals. Specifically, the antenna modules 208 can either transmit or receive radar signals, as part of transforming the radar signals, based on an operational mode or configuration of the antenna modules 208. For example, if an antenna module is functioning as a transmitting antenna module, then the antenna module can function to transmit radar signals into a channel. Conversely, if an antenna module is functioning as a receiving antenna module, then the antenna module can function to receive radar signals from a channel in response to radar signals transmitted into the channel.

The antenna modules 208 include frequency-scanning antenna(s) 210 and illumination antenna(s) 212. The frequency-scanning antenna(s) 210 function to transmit radar signals into a channel for performing high resolution imaging of the channel using frequency-scanned radar. Specifically, the frequency-scanned antenna(s) 210 can transmit a plurality of radar signals generated by the signal generator(s) 202, e.g. the frequency-scanning signal generator module 204, as part of performing a first transformation of a representation of the plurality of radar signals. The frequency-scanned antenna(s) 210 can be orientated at a first orientation and configured to transmit radar signals towards an area of interest from the first orientation. In transmitting radar signals through frequency-scanning, the frequency-scanning antenna(s) 210 can transmit the radar signals such that the radar signals are physically mapped to a plurality of unique beam angles corresponding to a plurality of unique frequencies. Specifically, the frequency-scanning antenna(s) 210 can transmit radar signals at beam angles corresponding to unique frequencies within a frequency band of reference signals used to transmit the radar signals. More specifically, as the input frequencies of the reference signals change, the wavelengths of the reference signals change. Changing the wavelengths of the reference signals, e.g. as the signals pass through a fixed length of transmission line, can change the phase of the reference signals. This phase shift causes the frequency-scanned antenna(s) 210 to transmit a steerable beam of radar signals through frequency-scanning, effectively beamforming the radar signals transmitted by the frequency-scanned antenna(s) 210. In various embodiments and as will be discussed in greater detail later, the frequency-scanning antenna(s) can also function to receive radar signals from a channel for purposes of performing high resolution radar imaging using frequency-scanning radar, e.g. as part of performing a first transformation of a representation of the radar signals.

The scanning direction of the frequency-scanned antenna(s) 210 varies as a function of input frequency, e.g. of the reference signals. If a radar signal transmitted by the frequency-scanned antenna(s) 210 has a wide bandwidth, the signal spans a wider range of spatial angles. As a result, the radar signal becomes "smeared" in space, degrading the overall resolution of the frequency-scanned radar imaging system 102. In order to prevent this, it is desirable to transmit a radar signal that is narrow enough in frequency bandwidth to not smear or otherwise distort a resultant radar beam spatially. Therefore, this narrow beamwidth of the frequency-scanning antenna(s) 210, as well as the angular scanning range, and the frequency scanning range all combine to set an upper limit on the bandwidth of radar signals that the frequency-scanning antenna(s) can transmit in performing high resolution radar imaging. Further, to realize high resolution, high range resolution for radar signals transmitted by the frequency-scanning antenna(s) 210 is desirable. This creates a problem, as range resolution in radar systems is inversely proportional to waveform bandwidth, thereby conflicting with the previously described desire of transmitting radar signals within a narrow bandwidth. This is a result of the Fourier uncertainty principle, which states that for a signal to have a short "width" in the time domain, it must have a large width in the frequency domain. The implicit assumption here is that range in radar is determined by taking a time-domain measurement. This can be done directly, e.g. measuring range by measuring a time delay using a short (hence, wide-bandwidth) pulse, or indirectly, e.g. by measuring the matched filter output of a frequency-modulated waveform. Accordingly, while it is desirable to transmit radar signals in a narrow band frequency range to perform high resolution frequency-scanning radar imaging, using the narrow band frequency range to perform high resolution frequency-scanning radar imaging can limit range measuring.

This problem will be discussed in greater detail later with respect to range determination, however in order to achieve high resolution, the frequency-scanning antenna(s) 210 can be configured to transmit radar signals in a narrow band frequency range. Specifically, the frequency scanning antenna(s) 210 can transmit radar signals from reference signals with frequencies in a narrow band frequency range. A narrow band frequency range can include an applicable frequency range for transmitting radar signals while reducing or otherwise eliminating effects of smearing and beam degradation in frequency-scanned radar. For example, a narrow band frequency range can include one of 6.765 Megahertz (MHz)-6.795 MHz, 13.553 MHz-13.567 MHz, 26.957 MHz-27.283 MHz, 40.66 MHz-40.7 MHz, 433.05 MHz-434.79 MHz, 902 MHz-928 MHz, 2.4 Gigahertz (GHz)-2.5 GHz, 5.725 GHz-5.875 GHz, 24 GHz-24.25 GHz, 61 GHz-61.5 GHz, 122 GHz-123 GHz, 244 GHz-246 GHz. Further, a narrow band frequency range can be a commercial radio frequency band, a military radio frequency band, and/or an industrial radio frequency band. Additionally, a narrow band frequency range can include an automotive radar frequency band.

The illumination antenna(s) 212 can function to receive radar signals from a channel for purposes of performing high resolution radar imaging using frequency-scanning radar. Specifically, the illumination antenna(s) 212 can receive radar signals that are reflected or scattered from the radar signals transmitted by the frequency-scanning antenna(s) 210. Therefore, the illumination antenna(s) 212 can perform a radar signal transformation, e.g. receive radar signals, that complements a radar signal transformation, e.g. transmit radar signals, performed by the frequency-scanning antenna(s) 210. In performing a radar signal transformation, the illumination antennas(s) 212 can perform a transformation, e.g. a different transformation performed by the frequency-scanning antenna(s) 210, of a second representation, e.g. a different representation from a representation performed by the frequency-scanning antenna(s) 210. For example, the illumination antenna(s) 212 can receive radar signals at a second representation that is different from a first representation that is used to transmit the radar signals.

The illumination antenna(s) 212 can be orientated towards an area of interest. The orientation of the illumination antenna(s) 212 with respect to an area of interest can be related to an orientation of the frequency-scanning antenna(s) 210 towards the area of interest. For example, the illumination antenna(s) 212 can be positioned at an orientation towards an area of interest that is orthogonal with respect to an orientation of the frequency-scanning antenna(s) 210 towards the area of interest. In various embodiments and as will be discussed in greater detail later, the illumination antenna(s) 212 can also function to transmit radar signals into a channel for purposes of performing high resolution radar imaging using frequency-scanning radar.

The frequency-scanned antenna(s) 210 can provide a narrow beam of radar signals in one dimension. In addition, and as will be discussed in greater detail later with respect to range determination, a phase measurement at two different frequencies can provide a measurement of range with high resolution. Hence, the frequency-scanned radar imaging system 102 can effectively focus the beam in two dimensions. It is therefore desirable to focus the beam in a third, spatial dimension, to form a full 3D high resolution image using frequency-scanned radar. Specifically, the spatial dimension can be perpendicular to a beam, e.g. fan-shaped beam, transmitted by the frequency-scanning antenna. With reference to the antenna arrangement 300 shown in FIG. 3, which will be discussed in greater detail later, the spatial dimension is represented by line 306.

Focusing in the spatial dimension can be accomplished through beamforming. Beamforming to focus in the spatial dimension can be accomplished in two ways, depending on whether the illumination antenna(s) 212 are transmitting or receiving.

First, if the illumination antenna(s) 212 are functioning to transmit radar signals into a channel, then phase-shifted replica radar signals can be transmitted from each antenna of the illumination antenna(s) 212. These replicas can add constructively and destructively to scan the beam in a direction of interest. Specifically, these replicas can add constructively and destructively to focus a beam along the spatial dimension, thereby forming a full 3D high resolution image using frequency-scanned radar.

Alternatively, beamforming can also be performed when the illumination antenna(s) 212 receive radar signals to focus along the spatial dimension to form full 3D high resolution imaging using frequency-scanned radar. Specifically, if each receive antenna of the illumination antenna(s) 212 is coupled to a separate receiver, and the signals from each receive antenna are independently recorded, then these recorded signals can be summed together to focus along the spatial dimension. More specifically, the recorded signals can be summed together with a fixed phase shift between them to recover one or more signals that impinged upon the illumination antenna(s) 212 from a particular direction of arrival. In turn, the beam can effectively be scanned in any direction, after the signal has been recorded, thereby allowing for focusing along the spatial dimension. This is known as single-input multiple-output (SIMO) because a single signal or phase-shifted replicas of a single signal) are transmitted, and multiple receive signals are then recorded and processed. In various embodiments, the signals received by the illumination antenna(s) 212 can be sampled simultaneously, e.g. coherently, with respect to a single master reference oscillator to accurately perform beamforming through. As will be discussed in greater detail later, the frequency-scanned radar imaging system can be configured to operate as a multiple-input multiple-output (MIMO) system for forming 3D high resolution images using frequency-scanned radar.

The frequency-scanning antenna(s) 210 can transmit radar signals at a first plurality of frequencies equal to a second number of the frequency band divided by a third number of the first resolution. Specifically, radar signals can be transmitted at unique frequencies that are shifted with respect to each other by a frequency shift of a first number of the plurality of unique frequencies divided by a second number of pixels in a region of interest corresponding to the radar signals. To illustrate this, the following scenario is described.

A maximum bandwidth for the frequency-scanned radar imaging system 102 is chosen. This is set by regulatory requirements and cost. For example, the frequency-scanned radar imaging system 102 can operate in the worldwide automotive radar band from 76 GHz to 77 GHz. This provides a maximum bandwidth to use for frequency scanning of 1 GHz. Next, a spatial resolution for the frequency-scanned radar imaging system 102 is chosen in degrees. If 10 cm resolution at 50 meter range is desired, then a spatial resolution/beamwidth of 0.1° is preferred. Then, an angle to scan over is picked. For example, an angle of +/−600 from straight ahead (straight ahead is also called "broadside") can be picked. As follows, as the scanning range is +/−60=120 deg total, and our beamwidth is 0.1 degrees, there are 1,200 discrete beam positions over the scanning range. This gives 1,200 "pixels" in the horizontal/azimuthal direction.

Since frequency-scanning is performed, the 1 GHz bandwidth is used to sweep the full angle of interest. Specifically, the antenna can be designed so that a carrier frequency of 76 GHz scans the beam to the −60 degree position, a carrier frequency of 76.5 GHz scans it to 0 degrees (broadside), and a carrier frequency of 77 GHz scans it to the +60 degree position. This means that the carrier can be increased by a factor of 1 GHz/1,200 pixels=833 kHz to shift the beam from one pixel to the next pixel. As follows, if a signal with a bandwidth of more than 833 kHz is transmitted, then the signal can be smeared across multiple pixels.

Figure 3:
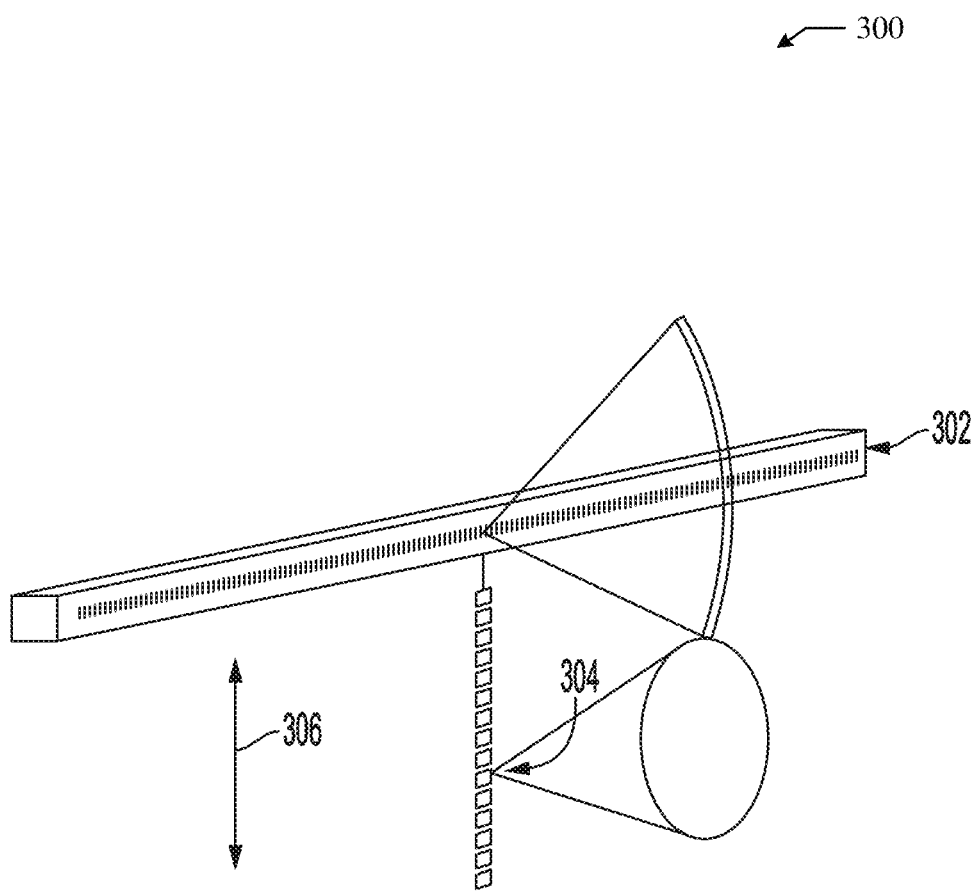
FIG. 3 shows a perspective view of an antenna configuration for performing high resolution imaging using frequency-scanned radar in accordance with some embodiments.

FIG. 3 shows a perspective view of an antenna configuration 300 for performing high resolution imaging using frequency-scanned radar. The antenna configuration 300 can be implemented as part of an applicable frequency-scanned radar imaging system for performing high resolution imaging using frequency-scanned radar, such as the frequency scanned radar imaging system 102 shown in FIG. 2.

The antenna configuration 300 includes a first antenna set 302 and a second antenna set 304. The corresponding first antenna set 302 and the second antenna set 304 can function as the corresponding frequency scanning antenna(s) 210 and the illumination antenna(s) 212. For example, the first antenna set 302 can function as the frequency-scanning antenna(s) 210 while the second antenna set 304 can function as the illumination antenna(s) 212. In another example, the first antenna set 302 can function as the illumination antenna(s) 212 while the second antenna set 304 can function as the frequency-scanning antenna(s) 210. The first antenna set 302 and the second antenna set 304 can be either or both electrically and physically coupled to each other. Alternatively, the first antenna set 302 and the second antenna set 304 can be implemented remote from each other. For example, the first antenna set 302 and the second antenna set 304 can be either or both physically and electrically separated from each other. Further in the example, in being electrically separate from each other, the first antenna set 302 and the second antenna set 304 can be electrically coupled to each other through another component or through while not being directly coupled to each other through a wired electrical connection.

Either or both the first antenna set 302 and the second antenna set 304 can perform multiplexing. Specifically, either or both the first antenna set 302 and the second antenna set 304 can perform multiplexing on received signals based on whether the first antenna set 302 and the second antenna set 304 are operating to receive radar signals. For example, if the second antenna set 304 is operating to receive radar signals that are ultimately transmitted by the first antenna set 302, then the second antenna set 304 can function to perform multiplexing on the received radar signals. Either or both the first antenna set 302 and the second antenna set 304 can apply applicable multiplexing techniques to perform multiplexing on received radar signals. For example, either or both the first antenna set 302 and the second antenna set 304 can apply one or a combination of time-division multiplexing (TDM), frequency-division multiplexing (FDM), and orthogonal frequency-divisional multiple multiplexing (OFDM) on received radar signals.

Further, either or both the first antenna set 302 and the second antenna set 304 can include individual antenna elements that combine to form one or more antenna arrays. Specifically, antenna elements of either or both the first antenna set 302 and the second antenna set 304 can form time-shifted antenna arrays. In another example, antenna elements of either or both the first antenna set 302 and the second antenna set 304 can form frequency shifted antenna arrays. Additionally, antenna elements of either or both the first antenna set 302 and the second antenna set 304 can form phase shifted antenna arrays.

Each of the first antenna set 302 and the second antenna set 304 can be configured to focus a radar beam in one dimension. Accordingly and as shown in the example configuration 300 shown in FIG. 3, the first antenna set 302 and the second antenna set 304 can be oriented perpendicular to each other. Specifically, the second antenna set 304 is shown as being centered underneath the first antenna set 302, but it could also be located above, to either side, or even remotely to the first antenna set 302. Regardless of the positioning of the second antenna set 304 with respect to the first antenna set 302, the second antenna set 304 can be oriented perpendicular to an orientation of the first antenna set 302 to ensure that beam focusing can be achieved across multiple dimensions. In the example configuration 300 shown in FIG. 3, one of the first and second antenna sets 302 and 304 can be used to transmit radar signals while the other antenna set is used to receive radar signal. Further, as shown in FIG. 3, the first antenna set 302 can be implemented using a slotted waveguide, as will be discussed in greater detail later, and the second antenna set 304 can be implemented as a plurality of patch antennas.

The first antenna set 302 is long in the horizontal direction and short in the vertical direction e.g. the spatial dimension 306. The horizontal direction/horizontal dimension can correspond to azimuthal measurements in an area of interest. The vertical direction/spatial dimension can correspond to elevation measurements in an area of interest. Because the first antenna set 302 is long in the horizontal dimension and short in the vertical dimension, the antenna can produce a fan-shaped beam that is narrow horizontally and tall vertically. The second set of antennas 304 can be operated independently and are therefore referred to as a set and not an array. A set, as used herein can include a plurality of antennas located in close proximity to each other that can operate independently or operate together as an antenna array. In the example shown in FIG. 3, the antenna elements in the second set of antennas 304 are shown operating independently, with each antenna having a single antenna conical beam shape. The antenna elements of the second set of antennas 304 can have a beam width that encompasses an area of interest while having low directivity. The second set of antennas 304 could be implemented by one or more antennas having a wide enough beam shape. In the example configuration 300, the second set of antennas 304 can be implemented as printed circuit patch antennas. Alternatively, the second set of antennas 304 can operate together as an array. When operating as an array, the second set of antennas 304 can form a radar beam with a fan-shape that is wide in the horizontal dimension and narrow in the vertical dimension, e.g. the spatial dimension 306.

Figures 4A, 4B:
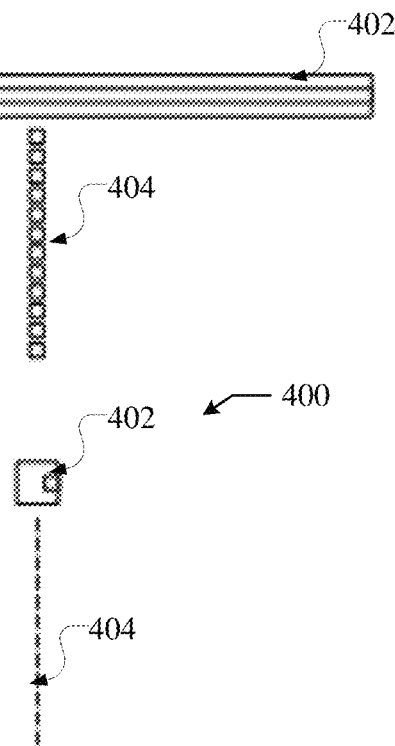
FIG. 4A shows a front perspective view of an antenna arrangement in accordance with some embodiments.
FIG. 4B shows a side perspective view of the antenna arrangement in accordance with some embodiments.
Figures 4C, 4D:
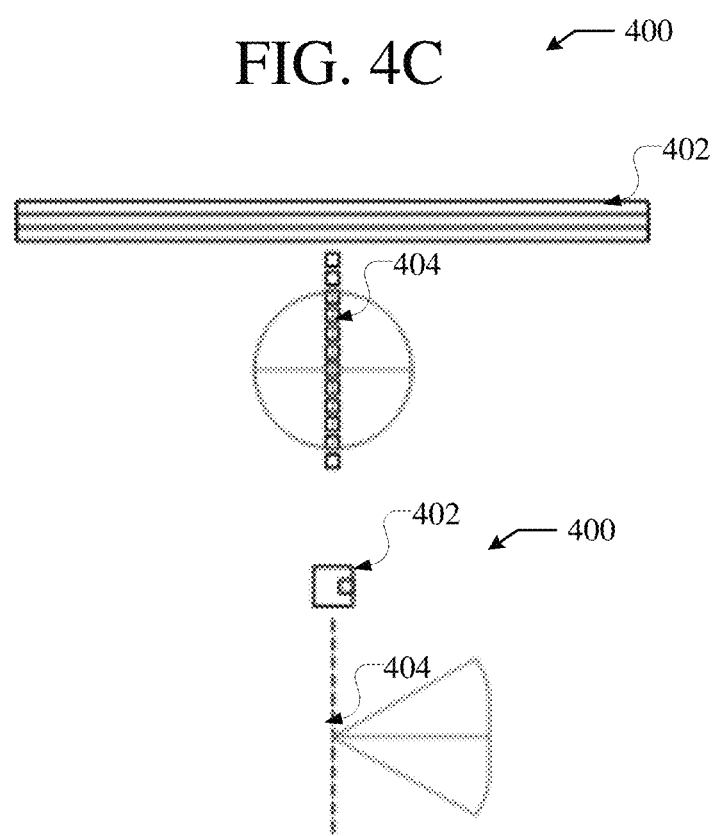
FIG. 4C shows a front perspective view of the antenna arrangement with a second set of antennas operating together in an array in accordance with some embodiments.
FIG. 4D shows a side perspective view of the antenna arrangement with the second set of antennas operating together in an array in accordance with some embodiments.

FIG. 4A shows a front perspective view of an antenna arrangement 400. FIG. 4B shows a side perspective view of the antenna arrangement 400. FIG. 4C shows a front perspective view of the antenna arrangement 400 with a second set of antennas 404 operating together in an array. FIG. 4D shows a side perspective view of the antenna arrangement 400 with the second set of antennas 404 operating together in an array. FIG. 4E shows a front perspective view of the antenna arrangement 400 with a first set of antennas 402 in a transmitting configuration. FIG. 4F shows a side perspective view of the antenna arrangement 400 with the first set of antennas 402 in a transmitting configuration. The first antenna set 402 can function as the frequency-scanning antenna(s) 210 while the second antenna set 404 can function as the illumination antenna(s) 212.

In various embodiments, the first antenna set 402 is a single leaky-wave antenna, as will be discussed in greater detail later. In FIGS. 4A-4F, similar to the layout in FIG. 3, the first antenna set 402 is shown above, oriented in the horizontal direction. The second antenna 404 set is shown below, oriented vertically. As discussed with respect to the antenna configuration 300 shown in FIG. 3, the second antenna set 404 can be located above, to the side of, or mounted remotely to the first antenna set 402. In various embodiments, the first antenna set 402 and the second antenna set 404 are oriented perpendicular to each other regardless of the locations of the first and second antenna sets 402 and 404 with respect to each other.

As before, antenna elements in the second antenna set 404 set can be operated independently. When the antenna elements are operated independently, as shown in FIGS. 4C and 4D, a conical beam, either transmit or receive beam, shape is created. Alternatively and not shown, the antenna elements of the second antenna set 404 can be operated together in an array. When the antenna elements of the second antenna set 404 are operated together in an array, a fan-shaped beam can be created. The fan-shaped beam can be wide in the horizontal dimension and narrow in the vertical dimension. The first antenna set 402 is wide in the horizontal dimension and narrow in the vertical dimension. As a result, a beam, e.g. transmit or receive fan-shaped beam, of the first antenna set 402, as shown in FIGS. 4E and 4F, is narrow in the horizontal dimension and wide in the vertical dimension.

As shown in FIGS. 4A-F, the second set of antennas 404 is arranged in a linear, vertical arrangement. Antenna elements of the second set of antennas 404 can be arranged a uniform linear spacing with specific element spacing, e.g. 0.5λ. Further, antenna elements of the second set of antennas 404 can be arranged as a sparse array with elements spacing for lowering the redundancy in spatial-frequency sampling, e.g. when compared to a non-sparse array. This can result in a wide array aperture leading to higher resolution for the same number of elements as a non-sparse array.

As discussed previously, the first antenna set 402 and the second set antenna 404 can be utilized in an applicable frequency-scanned radar imaging system for gathering high resolution images using frequency-scanned radar. In order to achieve high resolution, various mechanisms and techniques, as discussed herein, can be used. The first antenna set 402 can be implemented as a frequency-scanned antenna with a narrow beamwidth in the horizontal dimension. Because the first antenna set 402 is frequency-scanned, the direction of receive signals at the first antenna set 402 varies as a function of frequency. Hence, the first antenna set 402 implements a mapping from radio wave frequency to spatial angle. For example, if the first antenna set 402 is fed with reference signals at a frequency $f_{min}$, then the first antenna set 402 radiates at an angle $\theta_{min}$. Similarly, if the first antenna set 402 is fed with reference signals at a frequency $f_{max}$ then the first antenna set 402 radiates at a different angle $\theta_{max}$. Due the duality property of antennas, this frequency-to-angle mapping also holds when the first antenna set 402 is receiving. Thus, if the first antenna set 402 is outputting at its terminal a frequency of $f_{min}$ then it can be inferred that waves incident on the first antenna set 402 arrive from an angle of $\theta_{min}$. Therefore, radiation at this minimum frequency arriving from angles other than the minimum angle interferes destructively and is suppressed by the analog beamforming action of the fixed phase shifts between consecutive elements of first antenna set 402.

As discussed previously, the second set of antennas 404 can be configured to operate as a set of separate antenna elements. In this configuration, each antenna element of the second set of antennas 404 can transmit or receive an independent beam of radar signals that can encompass an entire area of interest. These beams are separable from each other, e.g. in time. Specifically, each antenna element of the second set of antennas 404 can transmit or receive one beam at a time. As follows, the separate transmitted waveforms and their received echoes can be stored, and coherent digital beamforming can be performed to focus the received signals into high-resolution pixels. This process is described in further detail later. In the horizontal dimension, an antenna can transmit signals with a narrow beamwidth. This antenna can implement analog beamforming, which focuses the beam in the horizontal dimension.

Alternatively and as discussed previously, the second set of antennas 404 can be configured to operate together as an array. Due to the beamforming operation of the second set of antennas 404 operating as an array, a beam shape can be produced that is wide in the horizontal dimension and narrow in the vertical dimension. Therefore, high resolution can be achieved because the beam patterns of the first set of antennas 402 and the second set of antennas 404 are perpendicular to each other, and corresponding transmitted and received radar signals overlap in a small region. This region of overlap can define the overall spatial resolution of a frequency-scanned radar imaging system incorporating the antenna arrangement 400.

Returning back to the example frequency-scanned radar imaging system 102, the signal processing modules 214 include a frequency-scanning focusing module 216, an illumination antenna focusing module 218, and a range determination module 220. The frequency-scanning focusing module 216, the illumination antenna focusing module 218, and the range determination module 220 can be implemented using the memory 230 and the processor(s) 232. Specifically the memory 230 can include instructions that cause the processor(s) 232 to perform the functions of the frequency-scanning focusing module 216, the illumination antenna focusing module 218, and the range determination module 220.

The frequency-scanning focusing module 216 functions to focus a first plurality of responses to transmitted radar signals. Responses to transmitted radar signals, as used herein, includes radar signals received from a channel in response to the radar signals transmitted into the channel. The frequency-scanning focusing module 216 can focus a plurality of responses to, e.g. a first representation of, radar signals transmitted by the frequency-scanning antenna(s) 210. More specifically, the frequency-scanning focusing module 216 can focus a first representation of a plurality of responses to radar signals by performing a frequency can of the plurality of responses to radar signals. Additionally, the responses to transmitted radar signals focused by the frequency-scanning focusing module 216 can include responses to radar signals that are actually received at the frequency-scanning antenna(s) 210.

The frequency-scanning focusing module 216 can use an applicable technique for focusing responses to transmitted radar signals associated with the frequency-scanning antenna(s) 210. As discussed previously, the frequency-scanning antenna(s) 210 can be focused based on the mapping from radio wave frequencies to spatial angles implemented at the frequency-scanning antenna(s) 210 as a result of the antenna(s) 210 using frequency-scanning radar. Specifically, the frequency-scanning focusing module 216 can perform a frequency scan of the first plurality of responses to focus the first plurality of responses. In performing the frequency scan, the frequency-scanning focusing module 216 can combine the first plurality of responses to form one or more antenna beams. Subsequently, the frequency-scanning focusing module 216 can identify from the antenna beams, the unique beam angles of the transmitted radar signals corresponding to the first plurality of responses, effectively frequency scanning the plurality of responses. As discussed previously, this is possible due to the duality property of antennas and the fact that frequency-scanned antennas receive signals from a direction that varies as a function of frequency.

The frequency-scanning focusing module 216 can identify, e.g. using a corresponding first representation of radar signals, first spatial data at spatial locations along a first dimension corresponding to the plurality of unique beam angles. For example, with reference to the antenna arrangement 300 shown in FIG. 3, the frequency-scanning focusing module 216 can identify spatial data along a horizontal direction, e.g. a direction perpendicular to the spatial dimension/vertical dimension represented by line 306. Spatial data can include applicable data describing objects, scattering objects, properties of objects and scattering objects, and lack of objects and scattering objects at corresponding spatial locations. For example, spatial data can include that an object is present at a specific spatial location. In another example, spatial data can include a size and an orientation of an object present at a specific spatial location. In yet another example, spatial data can include that an object is not at a spatial location.

The frequency-scanning focusing module 216 can identify the first spatial data after focusing the first plurality of responses, e.g. based on the plurality of unique beam angles identified from the plurality of responses as a result of focusing the plurality of responses by performing frequency scanning. Further, the frequency-scanning focusing module 216 can identify the first spatial data by analyzing the first plurality of responses for signal phase shifts, e.g. with respect to corresponding transmitted radar signals used to generate the plurality of responses. Specifically, the frequency-scanning focusing module 216 can identify the first spatial data by comparing phases of the first plurality of responses to corresponding transmitted radar signals used to generate the plurality of responses. The corresponding transmitted radar signals used to generate the plurality of responses can be identified based on the unique beam angles formed by the transmitted radar signals that are determined from the plurality of responses. Further, the frequency-scanning focusing module 216 can identify the first spatial data by analyzing the first plurality of responses for signal phase shifts corresponding to estimated scattering properties of objects and estimated objects within an area of interest.

Applicable techniques for taking accurate phase measurement in the presence of noise can be utilized by the frequency-scanned radar imaging system 102 to identify phase in noisy signals. For example, the frequency-scanned radar imaging system 102 can use phase unwrapping, e.g. implemented using maximum likelihood estimation, to identify phase in noisy signals. Specifically, the frequency-scanning focusing module 216 can identify phases in the presence of noise using phase unwrapping in order to identify signal phase shifts.

The illumination antenna focusing module 218 functions to focus a second plurality of responses to, e.g. a representation of, transmitted radar signals. The second plurality of responses to transmitted radar signals focused by the illumination antenna focusing module 218 can be different from the responses focused by the frequency-scanning focusing module 216. In particular, and as discussed previously, the illumination antenna focusing module 218 can focus along the spatial dimension, e.g. line 306 in the example antenna arrangement 300 shown in FIG. 3. The responses to transmitted radar signals focused by the illumination antenna focusing module 218 can be responses to radar signals transmitted by the illumination antenna(s) 212. Additionally, the responses to transmitted radar signals focused by the illumination antenna focusing module 218 can include responses to radar signals that are actually received at the illumination antenna(s) 212.

As discussed previously, the plurality of responses can be focused by the illumination antenna focusing module 218 based on whether the responses are received in conjunction with the illumination antenna(s) 212 functioning as transmitting antennas or receiving antennas. For example, if the illumination antenna(s) 212 are functioning as transmitting antennas, then phase shifted replica signals can be transmitted by the illumination antenna(s) to perform beamforming and focus the plurality of responses, e.g. along the spatial dimension. Alternatively, if the illumination antenna(s) 212 are functioning as receiving antennas, then responses can be summed with a fixed phase shift to perform beamforming and focus the plurality of responses, e.g. along the spatial dimension.

The illumination antenna focusing module 218 can identify second spatial data, using a representation of radar signals, at second spatial locations along a second dimension using the second plurality of responses. Specifically, the illumination antenna focusing module 218 can identify spatial data at spatial locations along a second dimension with respect to a first dimension along which the frequency-scanning focusing module 216 identifies spatial data. The second dimension can be perpendicular to the first dimension along which the frequency-scanning focusing module 216 identifies spatial data. For example, the illumination antenna focusing module 218 can identify spatial data for spatial locations along the vertical/spatial dimension represented by line 306 shown in the example antenna arrangement 300 shown in FIG. 3.

The illumination antenna focusing module 218 can focus the second plurality of responses by gathering digital samples of the second plurality of responses, e.g. digitally sample the second plurality of responses. As follows, the illumination antenna focusing module 218 can identify the second spatial data at the second spatial locations by estimating scattering properties of the second plurality of responses using the gathered digital samples of the second plurality of responses. Further, the illumination antenna focusing module 218 can focus the second plurality of responses by forming one or more digital antenna beams based on the second plurality of responses. A digital antenna beam can represent an elliptical slice in space of one or more radar signals, such as the narrow beam slice emitted by an antenna element of the first set of antennas 402, as shown in FIG. 4E. As follow, the illumination antenna focusing module 218 can identify second spatial data at the second spatial locations by analyzing the one or more digital antenna beams for one or more scattering properties, e.g. scattering properties of objects within the area of interest.

Further, the illumination antenna focusing module 218 can focus the second plurality of responses by forming one or more analog antenna beams based on the second plurality of responses. As follows, the illumination antenna focusing module 218 can identify the second spatial data at the second spatial locations by analyzing the one or more analog antenna beams for one or more scattering properties, e.g. scattering properties of objects within the area of interest. Additionally, the illumination antenna focusing module 218 can focus the second plurality of responses by analyzing delay properties of the responses. Further, the illumination antenna focusing module 218 can identify the second spatial data at the second spatial locations by analyzing the second plurality of responses for phase shifts corresponding to estimated scattering properties of objects, e.g. estimated objects, within the area of interest.

The range determination module 220 functions to determine one or more range values within an area of interest. Specifically, the range determination module 220 can identify one or more range values within the area of interest as part of performing high resolution imaging, e.g. 3D imaging, of the area of interest using frequency-scanned radar. More specifically, the range determination module 220 can identify one or more range values within the area of interest by analyzing a plurality of responses and one or more corresponding representations of radar signals, e.g. the first plurality of responses for signal phase shifts.

Further, the range determination module 220 can use a plurality of responses to radar signals and one or more corresponding representations of the radar signals to identify range values within the area of interest. Specifically, the range determination module 220 can use response to radar signals transmitted by either or both the frequency-scanning antenna(s) 210 and the illumination antenna(s) 212 to identify one or more range values within the area of interest. In various embodiments, the range determination module 220 can process the same plurality of responses processed by the frequency-scanning focusing module 216 for identifying the first spatial data to determine the one or more range values within the area of interest. For example, the frequency-scanning focusing module 216 can focus a first plurality of responses to radar signals and use the focused plurality of responses to the radar signals to generate spatial data along a horizontal direction within an area of interest. Further in the example, the range determination module 220 can use the same plurality of responses to radar signals to identify one or more range values within the area of interest.

As discussed previously, while it is desirable to transmit radar signals in a narrow band frequency range to perform high resolution frequency-scanning radar imaging, using the narrow band frequency range to perform high resolution frequency-scanning radar imaging can limit range resolution. If coherent measurements are taken by a radar system, then the radar system actually has two ways to measure range and solve this problem. The first and most common technique, as described previously, is to measure range through time-domain measurement. The other technique for measuring range is to measure phases of reflected waves. Measuring phases of reflected waves to determine range is very precise but also very ambiguous. Specifically, measuring the phase of a wave reflected from a target can produce an infinite or near infinite number of range solutions, which repeat every $\lambda/2$.

Combining both wide-bandwidth measurements with phase measurements in radar has been implemented in synthetic aperture radar (SAR). SAR uses pulse compression to resolve targets downrange, and phase information is used to isolate returns in the cross-range direction. In particular, SAR uses transmitted bandwidth to generate measurement resolution in the downrange direction, and phase to generate measurement resolution in the cross-range direction.

In contrast, the signal processing modules 214 can use transmitted bandwidth to generate measurement resolution in the cross-range direction, and phase information to generate measurement resolution in the downrange direction. This works because phase measurements can be taken over very narrow or even single frequencies, e.g. a narrow bandwidth. Therefore, the signal processing module 214 can effectively implement an inversion of the SAR technique.

This is advantageous over the SAR technique, as one problem with using phase to measure range is the ambiguity over intervals of $\lambda/2$. Taking a phase measurement at a second frequency, ambiguity can be eliminated, but only up to a certain maximum range. If two frequencies are used, the maximum unambiguous range is given by $R_{max}=c/2(f_2-f_1)$. Here c is the speed of light and $f_1$ and $f_2$ are the two carrier frequencies transmitted, and at which the phase measurements are taken. Note that only the difference between the frequencies is important, not their absolute magnitude. If the two frequencies differ by 1 MHz, they produce a maximum unambiguous range of 150 m. In contrast, the signal processing modules 214 can use transmitted bandwidth to generate measurement resolution in the cross-range direction, and phase information to generate measurement resolution in the downrange direction. This works because phase measurements can be taken over very narrow or even single frequencies, e.g. a narrow bandwidth. Therefore, the signal processing module 214 can effectively implement an inversion of the SAR concept.

Further, as discussed previously, the frequency-scanned radar imaging system 120 can be configured to operate with or part of a potentially moving vehicle, e.g. an automobile or a drone. Therefore, the ability to accurately range targets which are in motion is critical. In addition, it is advantageous if the frequency-scanned radar imaging system can identify the instantaneous velocity of remote targets. Specifically, knowledge of a remote object's instantaneous velocity vector can potentially aid in obstacle detection for safety-critical intelligent machine applications. The dual-frequency ranging technique described herein, e.g. with respect to the range determination module 220, is suitable for measuring the Doppler shift of moving targets, which can be used to identify velocities of the targets. Specifically, the frequencies of the reflected signals from a target object can be measured directly, and the difference from the originally-transmitted frequencies can be used to derive the Doppler shift of the target object. Furthermore, because the two carrier frequencies of the transmitted radar signals are close together in frequency, e.g. within a narrowband, then they will experience nearly identical Doppler shift. In turn, that target motion will have negligible impact on the accuracy of the range measurement and can be neglected, thereby allowing for accurate ranging of moving targets.

Returning back to the example frequency-scanned radar imaging system 102 shown in FIG. 2, the imaging modules 222 include an image formation module 224, an image parameterization module 226, and a signal frequency selection module 228. The image formation module 224, the image parameterization module 226, and the frequency selection module 228 can be implemented using the memory 230 and the processor(s) 232. Specifically the memory 230 can include instructions that cause the processor(s) 232 to perform the functions of the image formation module 224, the image parameterization module 226, and the signal frequency selection module 228.

The image formation module 224 functions to form one or more images of the area of interest. Specifically, the image formation module 224 functions to form one or more images of the area of interest as part of performing high resolution frequency-scanning radar imaging. The image formation module 224 can form the one or more images using the first spatial data identified by the frequency-scanning focusing module 216 and the second spatial data identified by the illumination antenna focusing module 218. Specifically, the image formation module 224 can form the one or more images using a first resolution along the first orientation based on the first spatial data at the first spatial locations along the first dimension, e.g. along a horizontal direction/a direction perpendicular to the spatial dimension represented by line 306. Further, the image formation module 224 can form the one or more images using a second resolution along the second orientation based on the second spatial data at the second spatial location along the second dimension, e.g. along the direction of the spatial dimension represented by line 306. For example, the image formation module 224 can generate an image of an object within the area of interest with respect to the orientation/first orientation of the frequency-scanning antenna(s) 210 and the orientation/second orientation of the illumination antenna(s) 212 using the first spatial data and the second spatial data.

The image formation module 224 can form 3D images of an area of interest as part of performing 3D high resolution frequency-scanning radar imaging. 3D images generated by the image formation module 224 can include individual voxels. The individual voxels can comprise a planar portion that is normal to a direction of one or more range values of the area of interest identified by the range determination module 220. Further, the individual voxels can include spatial range data corresponding to the one or more range values identified by the range determination module 220. The planar portion of the individual voxels can be identified, e.g. by the imaging module 222, from the first and second spatial data identified by the corresponding frequency-scanning focusing module 216 and the illumination antenna focusing module 218. Specifically and as will be discussed in greater detail later, the data of the voxels, e.g. the planar portions of the voxels, can be identified by determining the energy that was scattered from a specific voxel position in space during, at least a portion of, the frequency-scanning radar imaging procedure. More specifically and as will be discussed in greater detail later, the data of the voxels can be identified through matched filtering.

The image parameterization module 226 functions to identify pixel parameters for at least a portion of an area of interest. Pixel parameters can include applicable parameters defining an image on a pixel level for generating the image through high resolution frequency-scanning radar imaging. For example, pixel parameters can include a number of pixels for forming an image, a size of each pixel for forming an image, and corresponding spatial locations within an area of interest for each pixel, and corresponding spatial data for generating the pixels to form an image of an area of interest through high resolution frequency-scanning radar imaging. The image parameterization module 226 can define pixel parameters of an intended image of an area of interest. An intended image can include all or a portion of the area of interest. For example, an intended image can be an image of an object detected within the area of interest.

Further, the image parameterization module 226 can function to identify projection angles corresponding to the pixel parameters. The projection angles can include angles for transmitting plurality of radar signals to generate one or more images defined by the pixel parameters through high resolution frequency-shifting radar imaging. More specifically, the projection angles can include projection angles at which the frequency-scanning antenna(s) 210 can transmit radar signals to create one or more images according to the pixel parameters through high resolution frequency-scanning radar. In identifying projection angles for controlling transmission of radar signals to perform high resolution frequency-scanning radar imaging, the image parameterization module 226 can identify projection frequencies based on the projection angles. Subsequently, the image parameterization module 226 can select the unique frequencies of the reference signals based on the identified projection frequencies. In turn, the signals generator(s) 202 can generate the reference signals based on the unique frequencies selected by the image parameterization module 226. The frequency-scanning antenna(s) 210 can then transmit radar signals according to the reference signals corresponding to the projection angles identified by the image parameterization module 226.

The signal frequency selection module 228 functions to control, at least in part, the radar signals transmitted by the antenna modules 208. In controlling the radar signals transmitted by the antenna modules 208, the signal frequency selection module 228 can select the frequency band, e.g. of the references signals, used to generate the radar signals transmitted by the antenna modules 208. Further, the signal frequency selection module 228 can select the plurality of unique beam angles and the corresponding plurality of unique frequencies used by the frequency-scanning antenna(s) 210 to transmit the radar signals. As follows, the signal frequency selection module 228 can provide instructions to the signal generator(s) to generate the radar signals, e.g. the radar signals transmitted by the frequency-scanning antenna(s) 210, using the plurality of unique frequencies identified by the signal frequency selection module 228. The signal frequency selection module 228 can identify the plurality of unique beam angles and the corresponding unique frequencies based on range values identified by the range determination module 220 and/or resolution of images of the area of interest. For example, the signal frequency selection module 228 can identify the unique beam angles and the corresponding unique frequencies based on the first resolution of the one or more images along the first spatial dimension, e.g. along a horizontal direction/a direction perpendicular to the spatial dimension represented by line 306. Effectively, the frequency band at which radar signals are transmitted, e.g. by the frequency scanning antenna(s) 210 can be selected based on the first resolution corresponding to the first spatial dimension in an image of the area of interest.

In various embodiments, the frequency-scanned radar imaging system 102 is configured for performing polarimeteric imaging. Specifically, the frequency scanned radar imaging system 102 can be configured to perform polarimeteric imaging through high resolution frequency-scanned radar imaging. In performing polarimeteric imaging, the frequency-scanned radar imaging system 102 can offer a significant advantage over current imaging systems used in vehicles, e.g. lidar systems. Specifically, polarimeteric imaging can be used to infer information about the nature of materials reflecting one or more radar beams through frequency-scanned radar imaging. More specifically, properties of materials, e.g. compositions of materials, can be identified through polarimeteric imaging based on scattering effects of incident radio signals on the materials. For example, polarimetry can be used to identify whether objects are man-made or non-man-made objects. Further, polarimetry can be used to identify the actual material of an object, e.g. asphalt, cloth, and skin.

In performing polarimeteric imaging, the antenna modules 208 can transmit waves with a single polarization, then observe/receive the reflections from the waves with two different antennas. For example, an antenna of the frequency-scanning antenna(s) 210 can transmit waves at a single polarization, and two different antenna(s) of the illumination antenna(s) 212 can observe the reflections of the waves transmitted at the single polarization. The two different antennas used to receive the reflections from the waves transmitted with the signal polarization can include an antenna sensitive to the transmitted polarization only, and an antenna sensitive to a polarization different than the transmitted polarization. In the context of the antenna configuration 300 shown in FIG. 3, this implies that whichever antenna set 302 and 304 is used for receiving would have a duplicate antenna that is sensitive to an alternative polarization. The frequency-scanned radar imaging system 102 is particularly well-suited to perform polarimetric imaging, because the receive circuit and receive antenna, e.g. the illumination antenna(s) 212, consist of few parts.

Either the first antenna set 302 and the second antenna set 304 can have at least one antenna at a first polarization that is used to receive radar signals at the first polarization and at least one antenna with a second polarization different than the first polarization. The antennas at the first and second polarization can receive responses to radar signals transmitted into a channel. Subsequently, the signal processing modules 214 can gather polarization data associated with the responses received at the first polarization and the second polarization. Polarization data can include applicable data related to transmission and receipt of radar signals at specific polarizations, e.g. different polarizations. For example, the polarization data can include an indication of the first polarization used to receive the response to the transmitted radar signals, an indication of the second polarization used to receive the responses to the transmitted radar signals, signal characteristics of the responses received at the first polarization, and signal characteristics of the responses received at the second polarization. For example, the polarization data can include power differences of responses received at antennas with different polarizations. In including information related to responses of the radar signals transmitted at the first polarization, the polarization data can correspond to one or more objects in the area of interest, e.g. that create the responses. In turn, the image formation module 224 can determine material characteristics of the one or more objects using the polarization data, e.g. based on the signal characteristics of the responses received at the first and second polarizations.

Specifically, the frequency-scanned radar imaging system 102 can implement polarimetry by transmitting linearly-polarized waves with the same orientation from all of the transmitting antennas, e.g. the frequency-scanning antenna(s) 210. The frequency-scanned radar imaging system 102 could then have two receive antennas, e.g. within the illumination antenna(s) 212. The first receive antenna can be configured to receive primarily vertically-polarized waves and reject horizontally-polarized waves. The second receive antenna can be configured to receive primarily horizontally-polarized waves and reject vertically-polarized waves. As will be discussed in greater detail later, the receive antennas can be implemented as serpentine waveguide slot arrays. Specifically, the first receive antenna can be implemented with a first waveguide having longitudinal slots relative to the E-plane of wave propagating within the waveguide, and the second receive antenna can be implemented with a second waveguide having edge wall slots. The longitudinal slots can transmit and receive radiation hat is polarized perpendicular to the array axis, while the edge-wall slots can transmit and receive radiation polarized parallel to the array axis. Both receive antennas can be configured to have the same characteristics, including the same field of view, the same frequency to angle mapping, and/or the same amplitude response. Because manufacturing inconsistencies between the two would always mean there are residual differences in these characteristics, a calibration can be performed to measure these differences. As follows, signal processing can be applied to account for these differences, e.g. subtract these differences, and effectively zero the two antennas to each other.

To take a polarimetric measurement, both receive antennas can be sampled at the same time. The frequency-scanned radar imaging system 102 can then compare the ratio of the power from both receive antennas to obtain a measure of the amount of power that was scattered by the target from the transmitted polarization into the perpendicular polarization.

Alternatively, the transmitting antennas, e.g. the frequency-scanning antenna(s) 210, can be configured to emit circularly polarized radiation of a certain state (for example, left-hand circular polarized). The frequency-scanned radar imaging system 102 can also have two receive antennas including a first receive antenna configured to receive primarily left-hand circular polarized waves and reject other polarizations, and a second receive antenna configured to receive primarily right-hand circular polarized waves and reject other polarizations. As before, both receive antennas can be sampled at the same time and the frequency-scanned radar imaging system 102 can compare the power ratio between the two receive antennas to determine how much power was scattered by the target into the opposite-sense polarization.

In various embodiments, the frequency-scanned radar imaging system 102 can include a vehicle management module. The vehicle management module can function to control a vehicle based on one or more images of the area of interest created through high resolution frequency-scanned radar imaging. Specifically, the vehicle management module can send instructions for use in managing control of a vehicle in operation based on one or more images of the area of interest. Further, the frequency-scanned radar imaging system 102 can include an object detection module. The object detection module can function to identify one or more objects in one or more images of the area of interest. The object detection module can use applicable techniques for recognizing objects in images to detect objects in one or more images of the area of interest. Accordingly, the vehicle management module can control a vehicle based on objects detected in the area of interest by the object detection module. For example, if the object detection module detects, in images of the area of interest, that an object is approaching a vehicle on the left, then the vehicle management module can control the vehicle to avoid the object approaching on the left.

Figure 5:
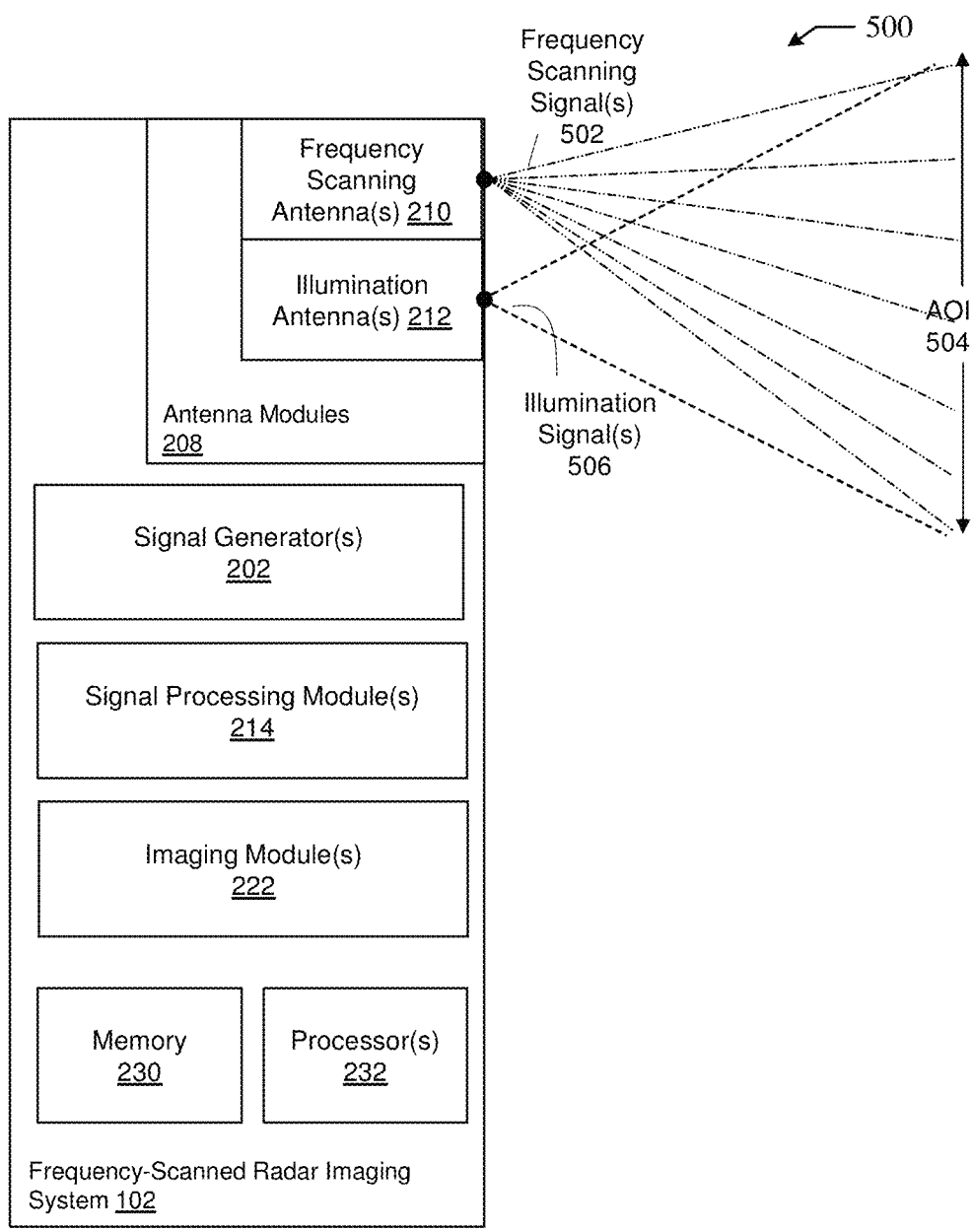
FIG. 5 shows an example environment of the frequency-scanned radar imaging system in operating to perform high resolution frequency-scanning radar imaging in accordance with some embodiments.

FIG. 5 shows an example environment 500 of the frequency-scanned radar imaging system 102 in operating to perform high resolution frequency-scanning radar imaging.

In the example environment 500, the frequency-scanning antenna(s) 210 can transmit frequency scanning signal(s) 502 into a channel towards an area of interest 504. The area of interest 504 can correspond to, e.g. be within, a field of view of a vehicle, e.g. a drone or an automobile. More specifically, the area of interest 504 can correspond to, e.g. be within, a field of view of a vehicle coupled to the frequency-scanned radar imaging system 102. For example, the area of interest 504 can correspond to a field of view of a vehicle that the frequency-scanned radar imaging system 102 is affixed to in order to control autonomous driving of the vehicle. The frequency-scanning antenna(s) 210 can transmit the frequency scanning signal(s) 502 into the channel towards the area of interest 504 using one or more reference signals generated by the signal generator(s) 202. For example, the frequency-scanning antenna(s) 210 can transmit the frequency scanning signal(s) 502 at a plurality of unique frequencies within a narrow frequency band based on reference signals in the narrow frequency band.

In the example environment 500, the illumination antenna(s) 212 can receive illumination signals(s) 506 from the channel. The illumination signal(s) 506 can be responses to the frequency scanning signals(s) 502 that are scattered by objects in the area of interest 504. Subsequently, the signal processing module(s) 214 can process the illumination signal(s) 506 for purposes of generating one or more images of the area of interest through high resolution frequency-scanning radar. Specifically, the signal processing module(s) 214 can focus a first subset of the illumination signal(s) 506 and identify first spatial data at first spatial locations along a first dimension using the focused first subset of illumination signal(s) 506. Further, the signal processing module(s) 214 can focus a second subset of the illumination signal(s) 506 and identify second spatial data at second spatial location along a second dimension using the focused second subset of illumination signal(s) 506. Additionally, the signal processing module(s) 214 can identify range values of the area of interest 504 using the frequency scanning signal(s) 502 and the illumination signals 506.

As follows, in the example environment 500, the imaging module(s) 222 can generate one or more high resolution images of the area of interest 504 using the first spatial data and the second spatial data. Further, the imaging module(s) 222 can control the signal generator(s) 202 to generate reference signals based on the identified range values of the area of interest 504, as determined by the signal processing module(s) 214. In turn, the frequency scanning signal(s) 502 can be transmitted toward the area of interest 504 based on the new reference signals generated based on the range values of the area of interest 504.

Figure 6:
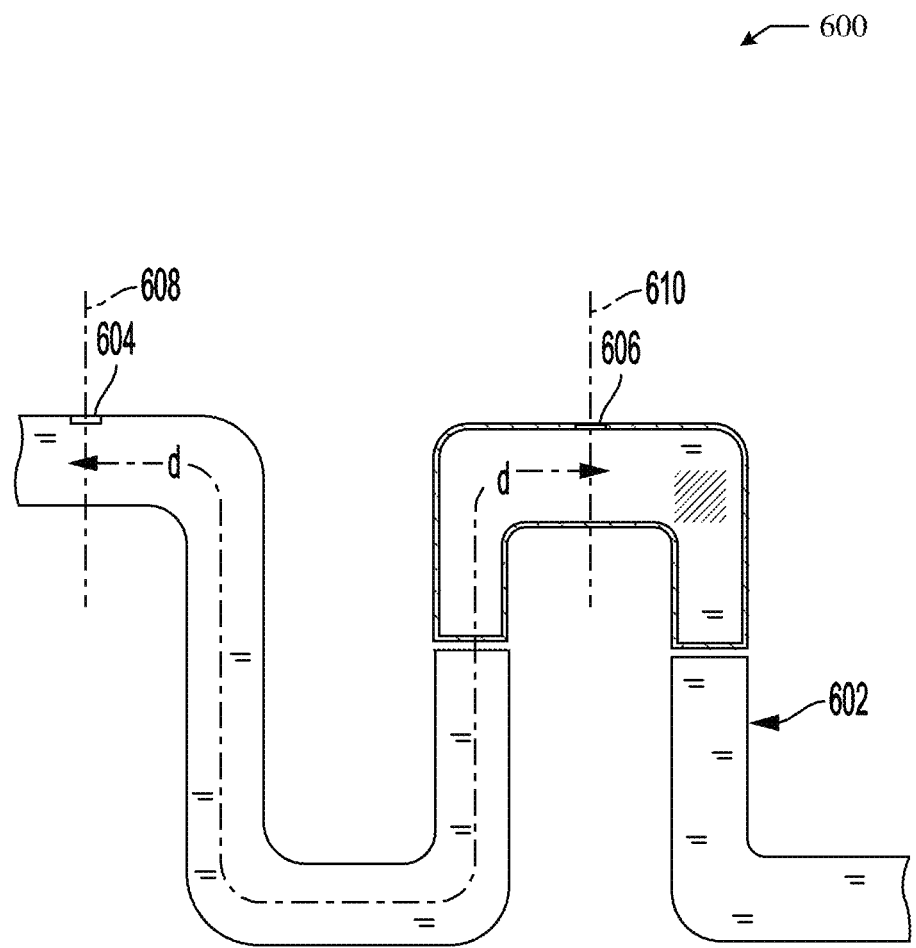
FIG. 6 shows a cross sectional view of a portion of a slot array antenna 600 formed by a serpentine waveguide in accordance with some embodiments.

FIG. 6 shows a cross sectional view of a portion of a slot array antenna 600 formed by a serpentine waveguide 602. The slot array antenna 600 can be used to form the frequency-scanning antenna(s) 210 and utilized to transmit radar signals through frequency-scanning. In particular, at least one of the first antenna set 302 and the second antenna set 304 can be implemented using the slot array antenna 600. In implementing the frequency-scanning antenna(s) 210, the waveguide 602 can be implemented orthogonal with respect to an overall orientation of the frequency-scanning antenna(s) 210 towards the area of interest. Alternatively, the waveguide 602 can be implemented parallel with respect to an overall orientation of the frequency-scanning antenna(s) 210 towards the area of interest.

The array 600 is formed by a serpentine waveguide 602. The waveguide 602 can serve as a transmission line for reference signals that are used to transmit radar signals through frequency-scanning. Slots 604 and 606 in the waveguide 602 serve as radiating elements of the slot array antenna 600 for transmitting the radar signals through frequency-scanning. The use of the waveguide 602 to form the slot array antenna 600 is advantageous because of the extremely low losses of waveguides, even at high frequencies of operation. Furthermore, the use of the waveguide 602 is advantageous as it can be manufactured inexpensively.

While the slot antenna array 600 is shows as being implemented through a serpentine waveguide 602, in various embodiments, a slot antenna array can be formed by a waveguide that is shaped other than a serpentine waveguide but has a constant length between the radiating elements, e.g. slots in the waveguide. Further, a waveguide used to form a slot antenna array can produce resonance across all or a portion of a frequency band of reference signals fed into the waveguide to transmit radar signals through frequency-scanning. Specifically, the serpentine waveguide 602 can produce resonance within the waveguide 602 of reference signals across the frequency band of reference signals that are fed into the waveguide to transmit radar signals through frequency-scanning.

In the example slot array antenna 600 shown in FIG. 6, the slots 604 and 606 lie on corresponding centerlines 608 and 610. Further, the slots 604 and 606 have a constant fixed distance d within the waveguide 602 between the corresponding centerlines 608 and 610 about which the slots are centered in the waveguide 602. While only slots 604 and 606 are shown as being separated by the fixed distance d, the waveguide 602 can include more than two slots separated by the fixed distance d. Because the distance d is fixed, e.g. a corresponding distance between slots 604 and 606 in the waveguide 602 is constant, and traveled by input reference signals in the waveguide 602, the phase shift between the two slots 604 and 606 varies monotonically with frequencies of the input reference signals. Therefore and as discussed previously, radar signals transmitted through the slots 604 and 606 can be frequency-scanned based on frequency of the input reference signals. The antenna elements formed by the slots 604 and 606 can have hemispheric radiation characteristics in transmitting radar signals fed by the waveguide 602.

The waveguide 602 can be fabricated, at least in part, from a reflective material to reference signals fed into the waveguide 602 for transmitting radar signals by the slot array antenna 600. Specifically, all or a portion of the waveguide 602 can be fabricated from a reflective material to fed reference signals, e.g. copper. In particular, the interior surface of the waveguide 602 can be fabricated from a material that reflects the reference signals fed into the waveguide 602 for transmitting radar signals by the slot antenna array 600.

The coating of the interior surface of the waveguide 602 can comprise a dissimilar material from a material that forms the body of the waveguide 602. Specifically, the serpentine waveguide 602 can have a body formed by a non-reflective material with respect to fed reference signals, e.g. an ABS plastic. Further, the interior of the body of the serpentine waveguide 602 can coated with a reflective material, e.g. copper, to the reference signals fed into the serpentine waveguide 602.

Figure 7:
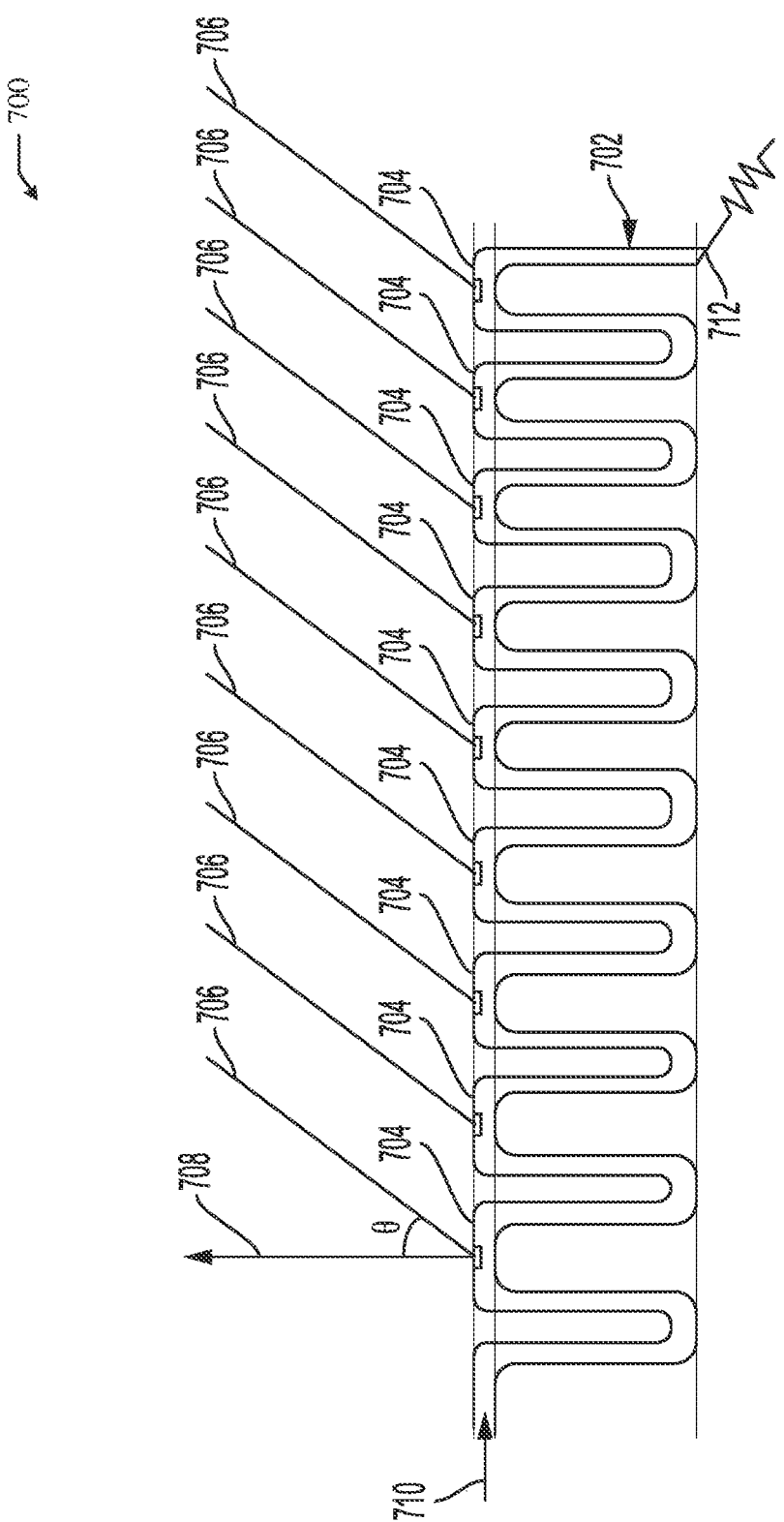
FIG. 7 shows a cross sectional view of another slot array antenna with a serpentine waveguide in accordance with some embodiments.

FIG. 7 shows a cross sectional view of another slot array antenna 700 with a serpentine waveguide 702. The slot array antenna 700 shown in FIG. 7 can be a view of a larger portion of the slot array antenna 600 shown in FIG. 6. The slot array antenna 700 includes a plurality of radiating elements 704. These slots 704 emit radar signals which sum constructively and destructively to produce a scanned beam 706 offset from the broadside direction 708 by a scanning angle θ. The scanning angle is produced by the frequency of an input reference signal 710 and phase shift between adjacent elements 704 generated by the serpentine distance s separating the slots (not shown). The input signal 710 ends at a terminating load 712.

Figure 8A:
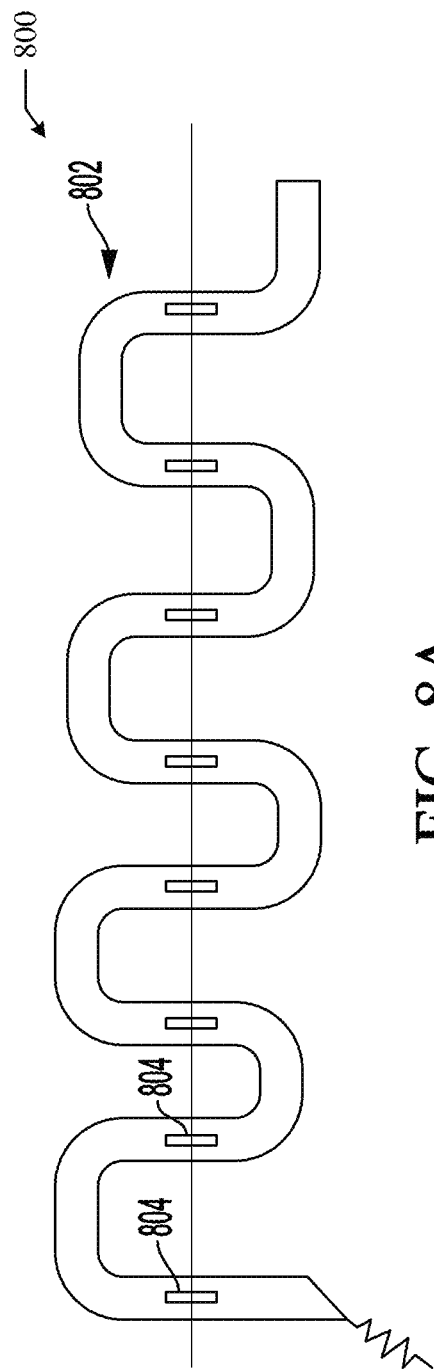
FIG. 8A shows a top perspective view of another slot array antenna with a serpentine waveguide in accordance with some embodiments.
Figure 8B:
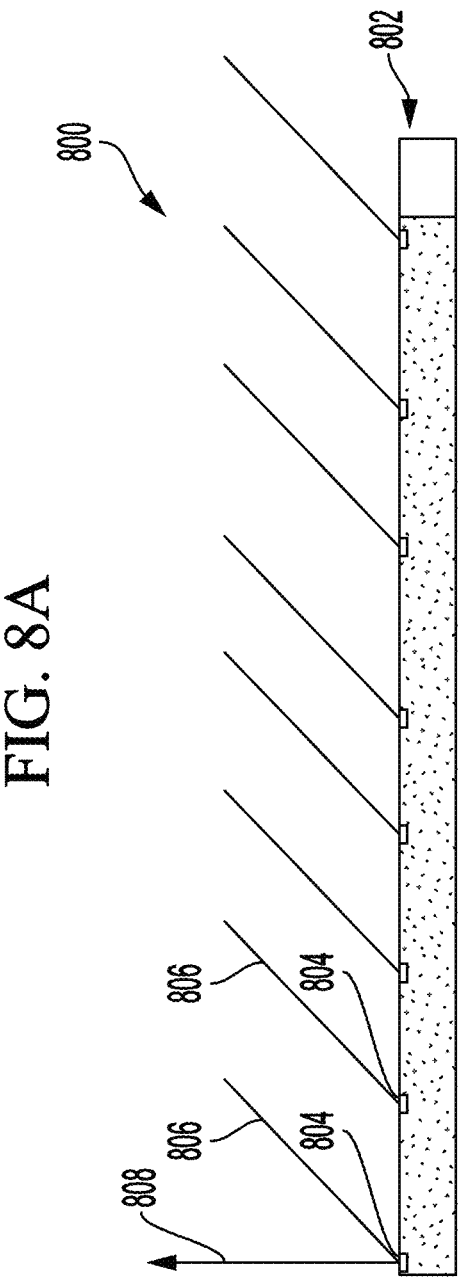
FIG. 8B shows a cross sectional view of the slot array antenna with the serpentine waveguide in accordance with some embodiments.

FIG. 8A shows a top perspective view of another slot array antenna 800 with a serpentine waveguide 802. FIG. 8B shows a cross sectional view of the slot array antenna 800 with the serpentine waveguide 802. The slot antenna array 800 can include a plurality of slots 804 on top of the waveguide 802 on an axis orthogonal to the axis of the serpentine bends of the waveguide 802. As shown in FIG. 7, the slots 804, emit radar signals 806 which sum to produce a scanned beam 806 which is offset from the broadside direction 808 by an angle θ.

While radiating elements of the slot antenna arrays described herein are described as slots in waveguides, in various embodiments, the radiating elements are not slots in waveguides. Specifically, the radiating elements can be elements with a higher directivity than radiating slots. Specifically, a slot has a hemispheric radiation pattern. Therefore, the radiating elements can be formed by one or more horn antennas. Horn antennas can attach directly to waveguide, can be constructed of the same material as the waveguide, and can have a very high gain. Directivity of an array of antennas can be a function of the directivity of the individual constituent radiators. Therefore, using a more highly-directive array element, such as a horn antenna, can result in a more highly-directive array for the same number of elements, or an array that requires fewer elements to achieve a desired beamwidth. However, the directivity of the individual antenna element limits the scanning range of the array as a whole, as the array must "look through" the radiation pattern of the individual radiating elements. This must be considered when designing antenna arrays.

A serpentine waveguide is a complex shape with tight dimensional tolerances. In particular, if slots are used as the radiating element, even a 1% variation in the length of the slot can significantly degrade performance. The array as a whole should also have high stiffness to support relatively large antennas that achieve a highly directional beam. Further, these antennas will also need to endure vibration, if mounted in an environment such as a ground vehicle or airborne platform, and warpage of the antenna array can produce significant side lobes.

Making a large, very stiff metal structure with tight tolerances and complex geometry is very expensive. Therefore, new manufacturing methods can be used to produce the antenna(s), e.g. the slot antenna arrays, while lowering the cost of making the antennas and serpentine waveguides. In particular, plastic waveguide, made of a material such as ABS with an interior surface coated with a radio-reflecting layer such as gold, silver, or copper can form the antennas described herein. This reflective layer could be applied using electroplating or electroless (chemical) deposition. The plastic can be formed with low cost manufacturing methods such as injection molding, hot stamping, or additive manufacturing ("3D printing"). 3D printing enables rapid manufacturing, which allows antennas to be built to order to meet different requirements. The plastic waveguide can be mounted on a support structure to provide the needed stiffness.

Additionally, the antennas described herein can be formed by printed circuit materials and structures such as microstrip antennas. The printed circuit material antennas can include a serpentine microstrip line patterned using printed circuit methods on a substrate. As before, the array has a plurality of radiating elements. In this embodiment the radiating elements are microstrip antenna elements, such as patch antennas. A microstrip antenna is much easier to manufacture than a waveguide, but has higher losses. For short range applications, these losses can be overcome by increasing the amount of transmitted power.

As above in the waveguide antenna case, using more directive elements improves the directivity of the whole array, allowing a smaller array to be used for the same desired directivity. For a printed antenna array the elements could be printed slot antennas/Vivaldi antennas, dielectric cavity antennas, printed dipoles or printed Yagi/Uda elements.

Figure 9B:
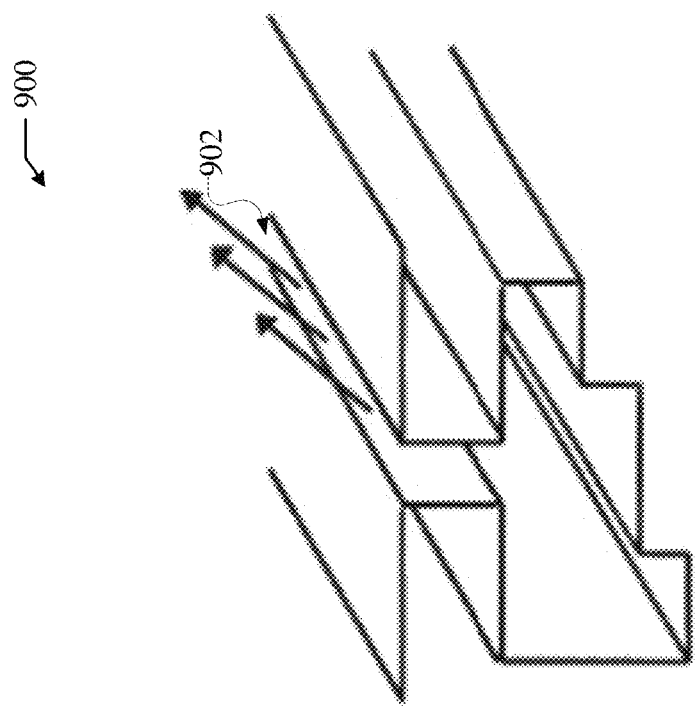
FIG. 9B shows a cross sectional view of a leaky wave antenna in accordance with some embodiments.
Figure 9A:
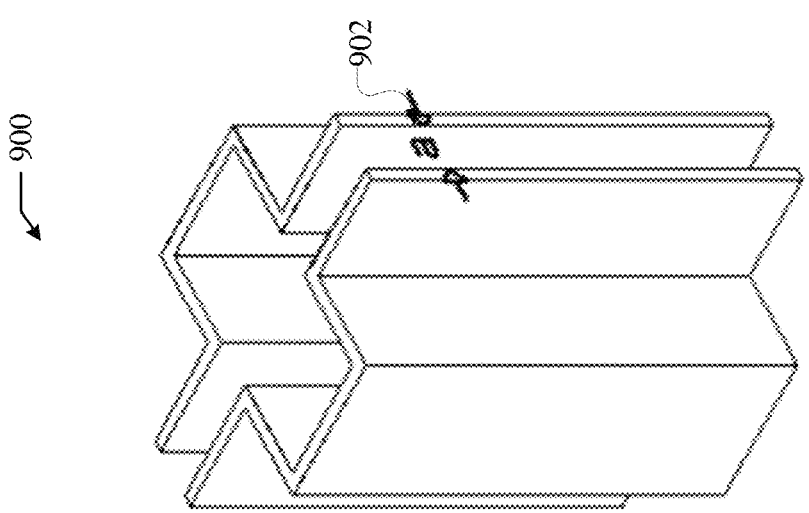
FIG. 9A shows a side perspective view of a leaky wave antenna in accordance with some embodiments.

Further, the antennas described herein can be implemented as leaky wave antennas. Specifically, the frequency-scanning antenna(s) 210 can be implemented using "fast traveling wave antennas," also referred to herein as "leaky wave antennas." Leaky wave antennas have the advantage of being implemented through much simpler geometry than serpentine waveguides. This simplifies the manufacturing process. FIG. 9A shows a side perspective view of a leaky wave antenna 900 and FIG. 9B shows a cross sectional view of a leaky wave antenna 900. The leaky wave antenna 900 includes a slit 902, e.g. down its length. The slit 902 can radiate power as part of frequency-scanning radar.

Figure 11:
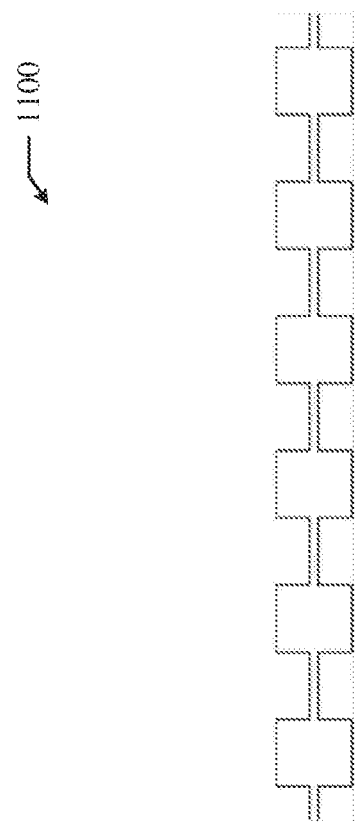
FIG. 11 shows a top view of a printed leaky wave antenna in accordance with some embodiments.
Figure 10:
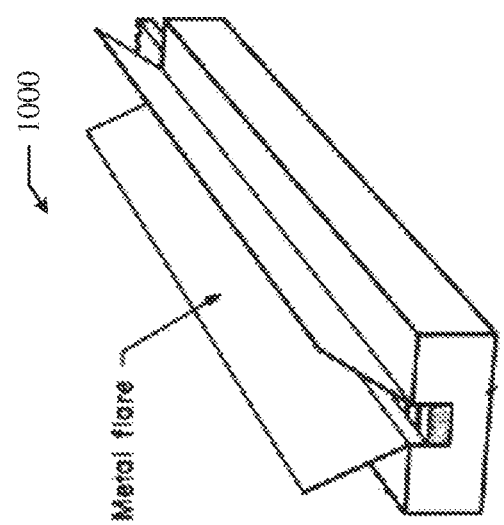
FIG. 10 shows a perspective view of a leaky wave antenna that utilizes horn antenna(s) in accordance with some embodiments.

FIG. 10 shows a perspective view of a leaky wave antenna 1000 that utilizes horn antenna(s). In the antenna 1000, the horn antenna can take the form of a flared metal. Leaky wave antennas can also be implemented as periodic dielectric structures or as microstrip patterns on printed circuit boards. Some potential examples of microstrip-based leaky wave antennas are zig-zag or serpentine microstrip lines, or a single microstrip line with adjacent resonant or non-resonant radiating elements placed periodically along the length of the line. FIG. 11 shows a top view of a printed leaky wave antenna 1100. The printed leaky wave antenna 1100 can include a series-fed array of patch antennas.

The disclosure now turns to a discussion of SIMO and MIMO high resolution frequency-scanned radar imaging systems. With respect to the antenna arrangement 300 shown in FIG. 3, a SIMO system can be implemented by transmitting from the first antenna set 302, e.g. a horizontal frequency-scanned array, and simultaneously receiving from all antennas in the second antenna set 304.

A more recent approach to electronic antenna scanning is known as MIMO. In contrast with SIMO systems, a MIMO system transmits multiple truly independent signals (not just phase-shifted replicas of the same signal) from different antennas to estimate the channel. To make these transmitted signals independent, the signals can be separated in one of time, space, code, and frequency.

If the transmitted signals are independent, then it can be possible to identify, at the time of reception, which signal came from which transmitting antenna. Specifically, if transmit antennas are separated in time, then received signal/responses from each transmit antenna can be resolved chronologically. This facilitates analysis of a whole new degree of freedom when trying to estimate the channel parameters and construct a final output image. Specifically, if a radar system transmits a single CW tone, then all scatterers in a scene can interfere with each other. If sampled with a quadrature mixer, a single in-phase/quadrature (I/Q) output is produced. Here, the "resolution" is the entire scene. If the radar system then switches to transmission at a second frequency, the same scatterers will constructively and destructively interfere in a different way, producing a different I/Q output. Taking measurements at multiple different frequencies can produce several different I/Q measurements. Each measurement can reveal new information about the scatterers in the scene.

Similarly, if either transmit antenna(s), e.g. the frequency-scanning antenna(s) 210, or the receive antenna(s), e.g. the illumination antenna(s), or both are moved to a new location, the differential ranges from the antennas to the scatterers change. In turn, the scatters will begin to interfere in different constructive and destructive ways, producing another different I/Q value. This same effect can be replicated by switching between multiple transmit antennas in different locations instead of actually physically moving the antenna(s). In particular, the frequency-scanned radar imaging system 102 can switch between multiple transmit antennas in different locations without physically moving the antennas in order to produce the different I/Q values.

By adding these additional degrees of freedom, a plurality of different complex I/Q measurements can be generated and subsequently used to form one or more final images of an area of interest. Each I/Q measurement can add new information that increases the resolution in, e.g. sharpens, the final image. The imaging modules 222 can combine these different measurements to reconstruct a representation of the scatterers in the channel to create one or more images of an area of interest.

Figures 12A, 12B:
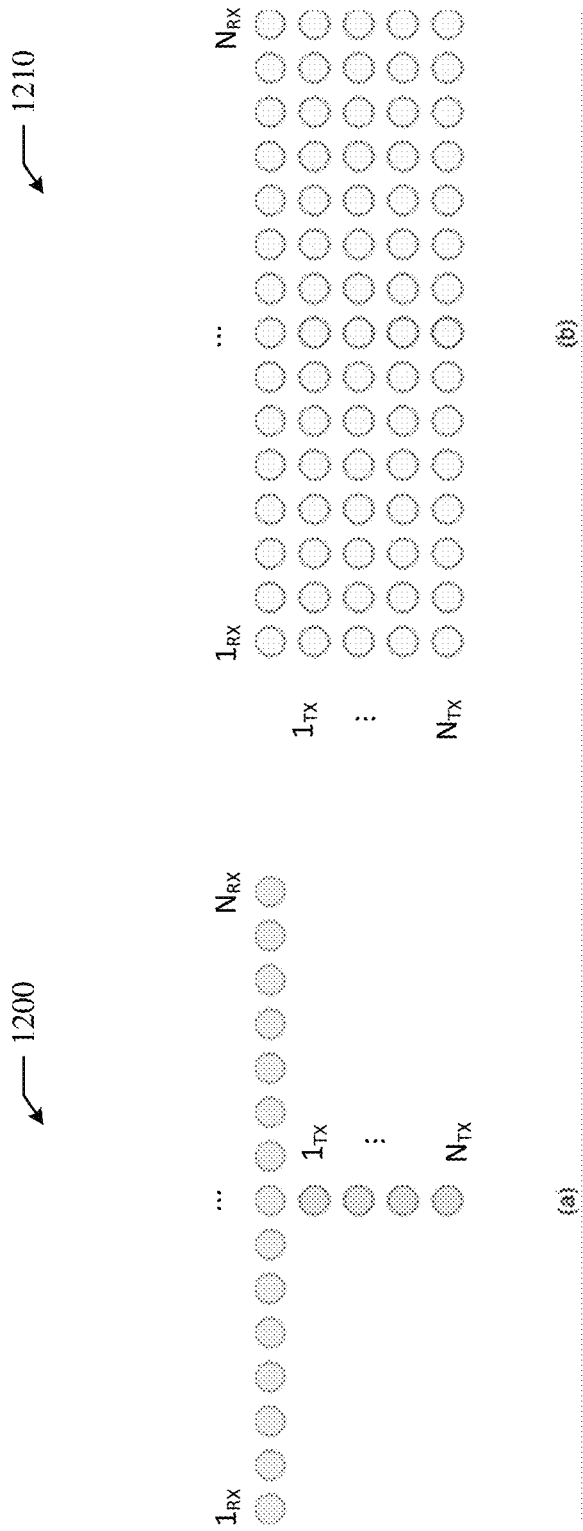
FIG. 12A shows an example of a real antenna array formed by the antenna arrangement shown in FIG. 3 in accordance with some embodiments.
FIG. 12B shows a virtual array formed by the real antenna array shown in FIG. 12A in accordance with some embodiments.

While the discussion has so far focused on frequency-scanned radar imaging systems that focus the beam in both dimensions using beamforming, in various embodiments, the frequency-scanned radar imaging system 102 can be implemented as a MIMO system. In this case, the first antenna set 302 of the antenna arrangement 300 shown in FIG. 3 can function as a receive array, and the second antenna set 304 can functions as a series of independent transmitting antennas. In this configuration, the transmit antennas can each transmit sequentially, e.g. one at a time, so that the transmitted signals are independent. This is time-division multiplexing. FIG. 12A shows an example of a real antenna array 1200 formed by the antenna arrangement 300 shown in FIG. 3. The real antenna array 1200 includes $N_{Tx}$ transmitting antennas and a receive antenna array consisting of $N_{Rx}$ elements. The receive antennas are frequency scanned, and therefore can perform the analog beamforming operation described before. The receive antennas can be formed by a slot array or another applicable frequency-scanning antenna array, such as a single leaky wave antenna. When a single transmitter is transmitting, the receiver can see, at its terminal, the combined superposition of $N_{Rx}$ elements. This represents the superposition of $N_{Rx}$ unique paths through space from a transmit antenna to a receive antenna. These unique paths through space are referred to as spatial channels. Because the transmit antennas are spread out in space, each transmit antenna generates a new set of I/Q measurements and thus a new spatial channel. If each transmitter transmits in turn, then after all transmitters are done transmitting, waveforms from $N_{Tx} \times N_{Rx}$ spatial channels have been recorded.

FIG. 12B shows a virtual array 1210 formed by the real antenna array 1200 shown in FIG. 12A. The virtual array 1210 is equivalent to a filled 2D array with $N_{Tx} \times N_{Rx}$ elements. The elements of the virtual array 1210 are located at the positions of the convolution of the transmit array positions and the receive array positions. Accordingly, the virtual array 1210 has an element for every spatial channel. The virtual array 1210 is the main advantage of a MIMO system. Specifically, with traditional beamforming, the resolution of the system is given by the physical antenna aperture. A MIMO radar allows the construction of a virtual aperture which can be larger than the physical aperture of the system through the created virtual array 1210. Specifically, the virtual aperture is the aperture created by the $N_{Tx} \times N_{Rx}$ measurements taken from slightly different spatial positions, causing the scatterers to interfere in different constructive and destructive ways, producing $N_{Tx} \times N_{Rx}$ different I/Q values. MIMO processing can take a system with $N_{Tx} \times N_{Rx}$ physical array elements and achieve a resolution comparable to a traditional beamforming array system with $N_{Tx} \times N_{Rx}$ array elements. In turn, high resolution can be achieved at lower cost as less complex antenna arrays are utilized.

Figure 13:
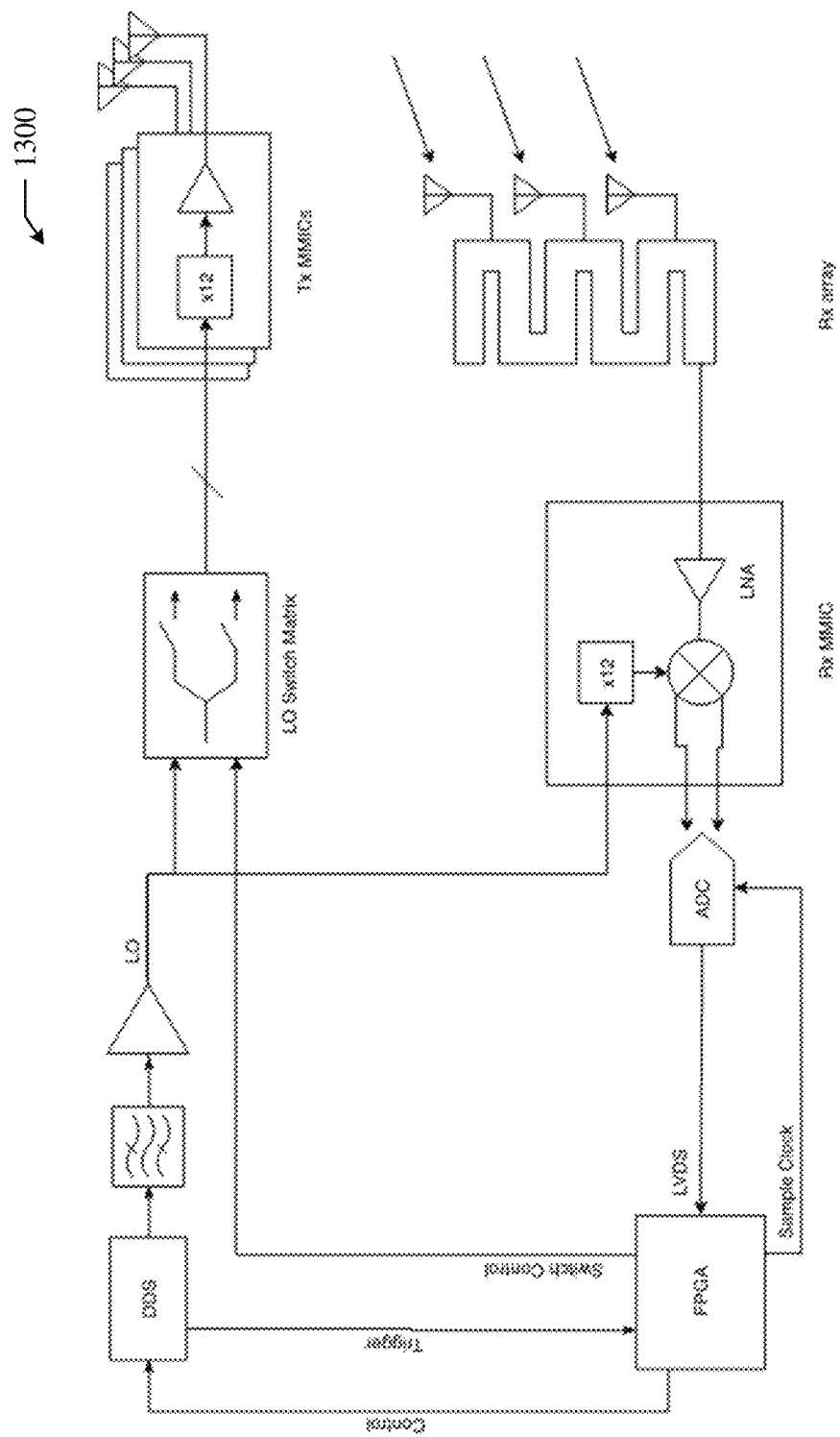
FIG. 13 shows a diagram of an arrangement of system hardware 1300 of the frequency-scanned radar imaging system in accordance with some embodiments.

FIG. 13 shows a diagram of an arrangement of system hardware 1300 of the frequency-scanned radar imaging system 102. The receive antenna is a frequency-scanned slot array shown schematically with a serpentine waveguide. This circuit implements the MIMO concept, so there are a plurality of independent transmit antennas. A field programmable gate array (FPGA) is the central computing node of the circuit. This chip runs all control and signal processing firmware. The transmission signal path begins at a direct digital synthesis (DDS) circuit controlled by firmware running on the FPGA. This firmware triggers the DDS to generate a sine wave at a desired carrier frequency. DDS can be used because for high accuracy, low phase noise, and the ability to generate arbitrary waveforms. Further, this allows for quick changing of the modulation scheme on the fly depending on the real time imaging requirements of the system. Additionally, the arrangement 1300 can be implemented through an application specific integrated circuit (ASIC).

After DDS, this waveform is bandpass filtered to remove digital modulation artifacts then amplified. The signal at the output of the amplifier is the system Local Oscillator (LO). This is a stable master reference clock for the whole system. The DDS circuit also generates a periodic trigger pulse, which is connected to the FPGA. This pulse can be used to synchronize data acquisition, as described later.

Because the antenna system can be a sparse array, the transmit and receive antennas may be spread across wide distances of up to several meters. Distributing high-frequency signals across such distances is a challenge. Specifically, the longer a wire is as a multiple of signal wavelengths, the more effective an antenna it is. However, this antenna effect produces two undesirable effects. First, signals can be corrupted by interference received through undesired antenna action. Second, the wire can radiate interference that harms the performance of other parts of the system or violates regulatory emissions standards. Additionally, it is usually expensive to design a circuit to transfer high frequency signals across long distances, e.g. precision connectors and high-quality wire must be used.

Therefore, it is highly desirable to limit the number of high frequency signals that are transferred within the circuit. If at all possible, it is also preferable to lower the frequency of signals that span wide distances. Alternatively, the signals can be configured to digital signals. Specifically, digital signals can be transferred with higher reliability using cheaper connectors and signal paths.

The arrangement of system hardware 1300 is designed for low cost and high reliability by limiting the number of high-frequency signals that are transferred across the arrangement 1300. Specifically, the amplified LO signal is the only high-frequency analog signal distributed throughout the circuit. This signal is fanned out to respective transmitter and receiver components. This signal can be transferred using low cost signal paths, such as printed circuit elements like microstrips and striplines. Further, this LO signal can operate at a lower frequency than the system carrier frequency to reduce overall system costs. Frequency multipliers can subsequently multiply this signal up to the carrier frequency as is needed. Specifically, the LO signal can operate in a range around 6 GHz.

The MIMO signal processing that is used relies on the transmitted signals being independent so that they can be separately recovered upon reception. To make these transmitted signals independent they can be separated in time, space, code, or frequency. In one embodiment of this invention, the transmitted signals are made independent by separating them in time. This is known as time division multiplexing (TDM) and can be implemented by only switching on a single transmitter at a time. This is advantageous, for its simplicity in implementation, while avoiding duplication of the DDS circuit. In order to implement TDM, the LO signal can connect to a switch matrix. The switch matrix receives a single input and switches it to only one of a plurality of outputs. Each of these outputs can be connected to a single individual transmitter MMIC distributed around the array. The switch matrix can be controlled by digital control lines from the FPGA.

A transmitter is active if it is receiving the LO signal from the switch matrix. So, to implement TDM the FPGA toggles the switch matrix to cycle through all of the transmitters. For each transmitter, a series of carrier frequencies are sent out (see below under "Method of Operation") and the response recorded from the output terminal of the receive antenna set. Because the receive antenna has frequency scanning behavior, the field of view will be scanned by stepping the frequency of the DDS unit. The LO frequency generated by the DDS unit can be multiplied up to a carrier frequency. A waveform can also be recorded at each carrier frequency. The recorded waveform can consist of the scattered reflection from the spatial position corresponding to that frequency. Each recorded waveform can also consist of a number of discrete digital samples, sampled according to the interval set by the Sample Clock. For example, the recorded waveforms can include 1024 samples.

Once the FPGA firmware has switched the switch matrix to pass the LO to the active transmitter, it can then trigger the DDS to generate the desired LO frequency. This LO waveform passes through the switch matrix to the enabled transmitter MIMIC and is multiplied up to the carrier frequency. The carrier frequency can be 96 GHz. This carrier frequency then passes through a power amplifier and out through a transmit antenna. In one embodiment, this transmit antenna is located external to and near the semiconductor die, for example on a PCB. Alternatively, the antenna can be located on the semiconductor die itself.

The transmitted radiation is radiated out into free space by the transmit antenna connected to a currently-active transmit MMIC. A portion of this radiation can reflect off of a plurality of remote scatterers, return, and be received by the receive antenna set. The receive antennas can be implemented as a slot antenna array.

Figure 14:
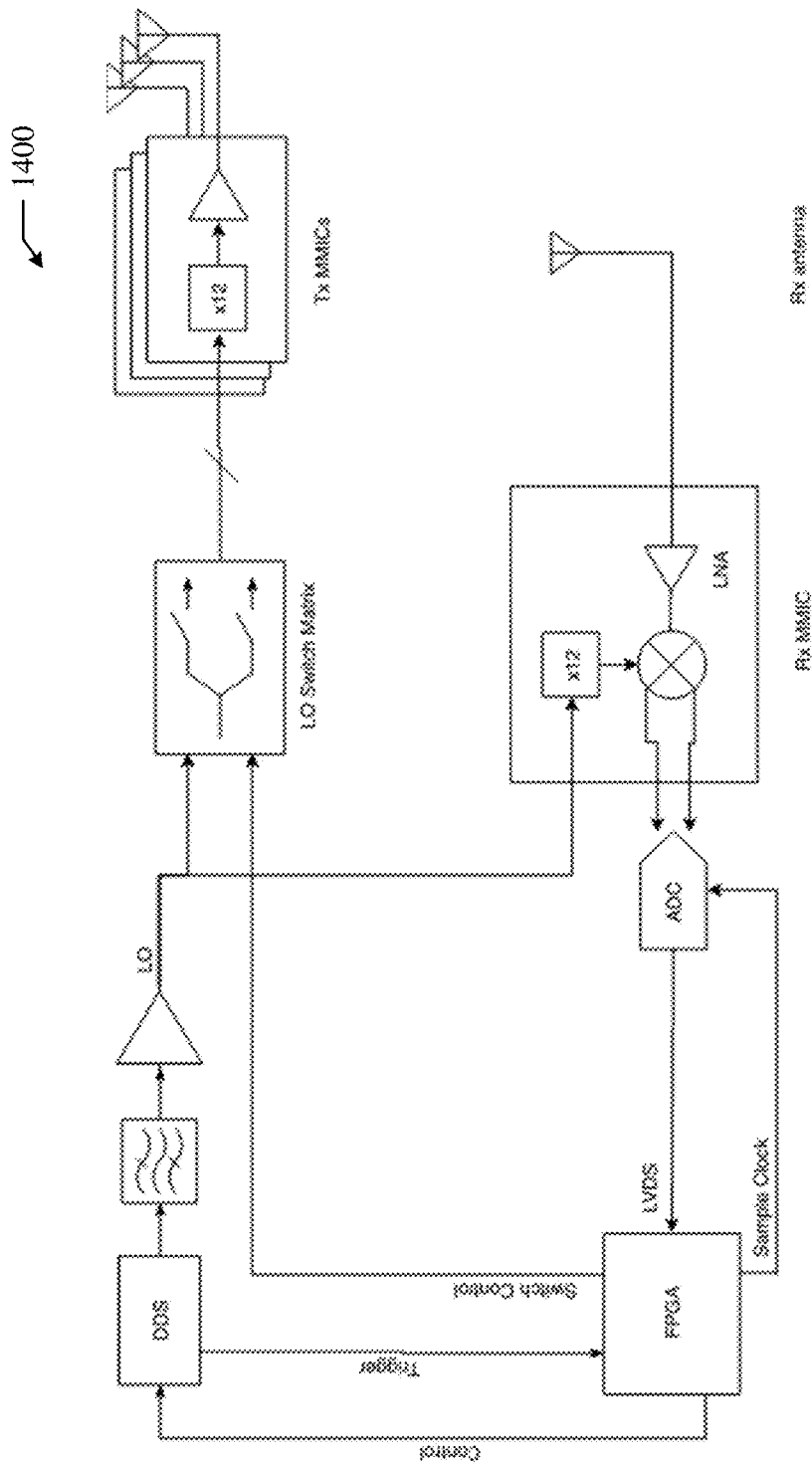
FIG. 14 shows an alternative arrangement of system hardware of the frequency-scanned radar imaging system in accordance with some embodiments.

FIG. 14 shows an alternative arrangement of system hardware 1400 of the frequency-scanned radar imaging system 102. Specifically, in alternative arrangement of system hardware 1400 shown in FIG. 14, the receive antenna set is implemented as a single antenna, e.g. a leaky wave antenna.

Figure 15:
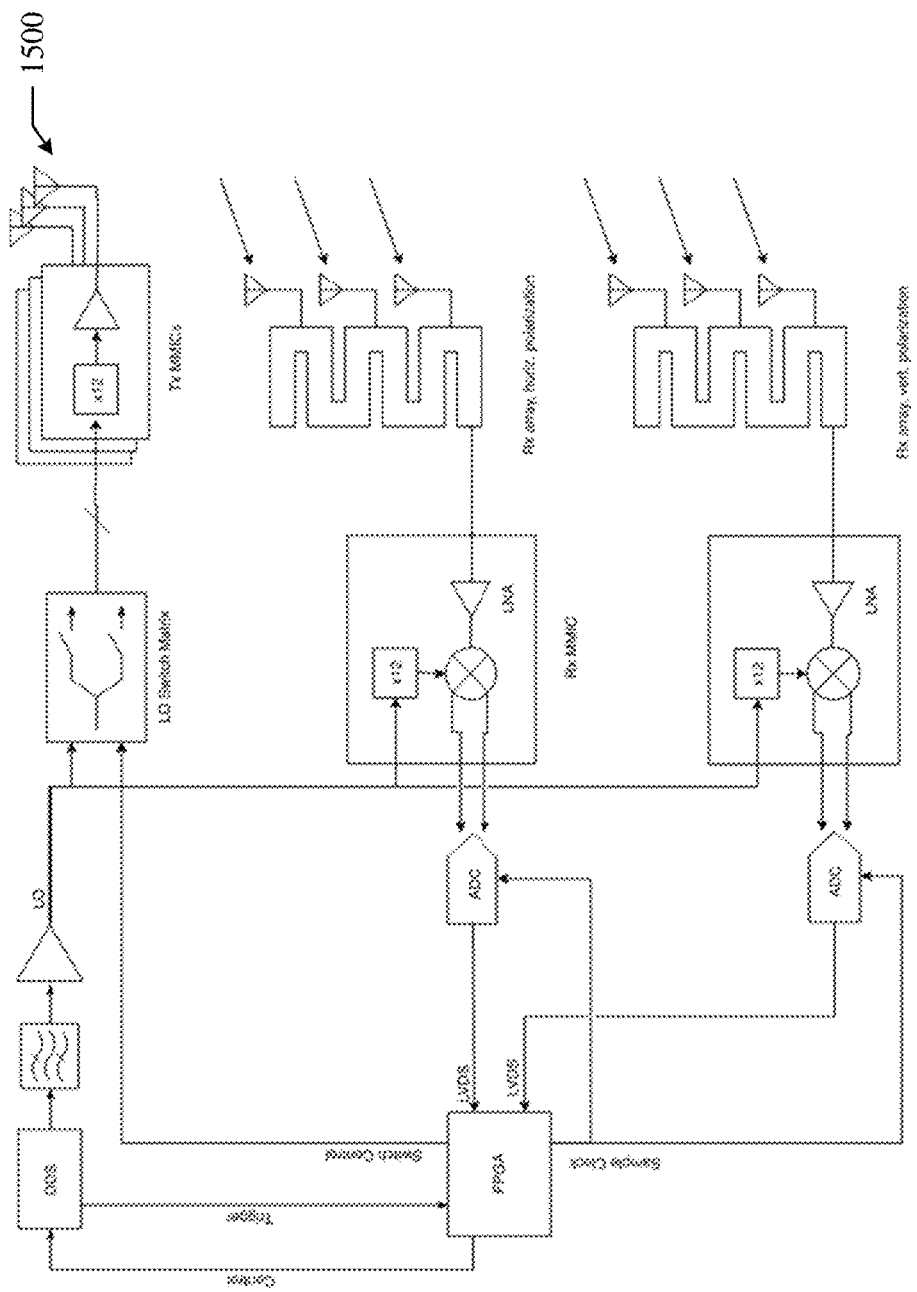
FIG. 15 shows an arrangement of system hardware of the frequency-scanned radar imaging system for performing polarimetric imaging in accordance with some embodiments.

FIG. 15 shows an arrangement of system hardware 1500 of the frequency-scanned radar imaging system 102 for performing polarimetric imaging. In the arrangement of system hardware 1500, the receive antenna set consists of two receive antenna arrays. One array is designed to receive horizontally-polarized radiation, and the other is designed to receive vertically-polarized radiation. Each receive array is connected to a receive MMIC which performs mixing and down-conversion, and an ADC which performs digital sampling. The arrangement 1500 includes only a few additional components for performing polarimetric imaging when compared to current polarimetric imaging systems, thereby making the arrangement 1500 cheaper and less prone to failure.

The receive antenna set is connected to an integrated receive MIMIC. This MIMIC contains a low noise amplifier (LNA), frequency multiplier, and quadrature mixer integrated together on one semiconductor die. The receiver chip also receives the LO signal through a passive splitter. As in the transmitter MMIC, this LO signal is multiplied up to carrier frequency.

The received signal passes through an LNA and into a mixer. The mixer combines the received signal with the multiplied LO signal. The mixer can produce in-phase (I) and quadrature (Q) outputs. Together these constitute the intermediate frequency (IF) waveform.

The time-division multiplexing (TDM) scheme of the arrangement 1500 shown in FIG. 15 is implemented as follows. First, the LO Switch Matrix is toggled to the first transmitter. As noted before, this switch matrix selects only one transmitter at a time. Next, the FPGA enables the DDS unit. Once enabled, the DDS unit can send the FPGA a trigger signal when the oscillator is stable. Alternatively, this trigger signal is not necessary because the DDS unit is immediately stable, or the FPGA contains calibration data to know when the DDS is stable without closed-loop feedback.

When the FPGA receives the trigger signal, it can begin generating the ADC sample clock. This clock connects to all ADCs. When polarimetric imaging is performed, there are multiple receive antennas and therefore multiple ADCs in the system. If there is more than one ADC, their measurements must be synchronized to the same sample clock. Therefore, all traces leaving the Control and Sample Clock MUX can be the same length to prevent clock jitter between the ADCs, despite being physically distributed across the design. Alternatively, traces can be different lengths. When traces are different lengths, a calibration routine can be used to correct for the different lengths of these traces, by applying a phase correction to the digitized waveforms in software. Utilizing traces of different lengths is advantageous as the traces can be routed for mechanical convenience and/or to prevent crosstalk and electromagnetic interference (EMI).

Further, the currently-active transmitter transmits a series of waveforms and the ADCs take samples of the received signals reflected from the channel. When the sampling process is complete, the FPGA stops generating the sample clock. Next, the LO Switch Matrix is switched to the next transmitter, DDS is enabled again, the sample clock again runs, and again the IF response is recorded. Then the LO Switch Matrix is switched to the next transmitter, and the process repeats until all transmitters have been activated once.

Figure 16:
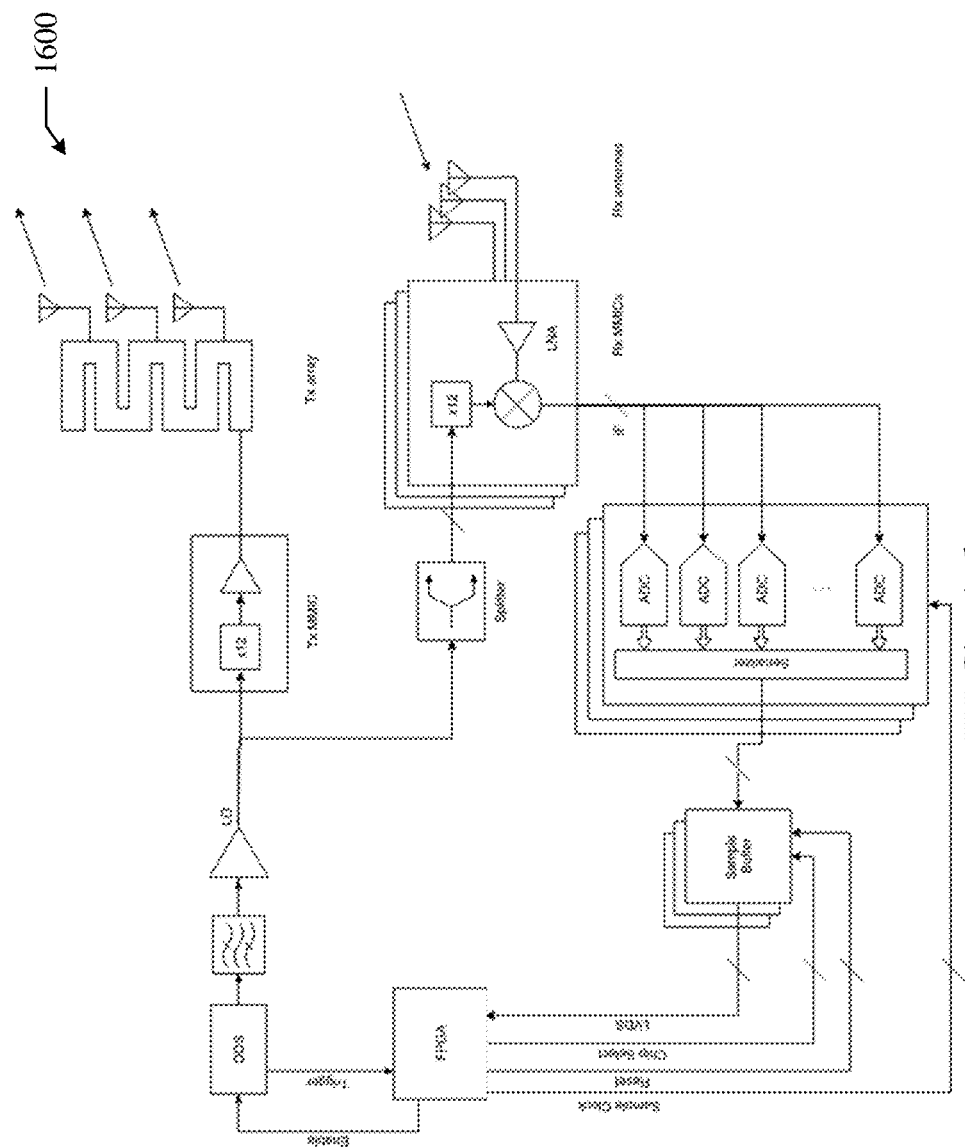
FIG. 16 shows an alternative arrangement of system hardware of the frequency-scanned radar imaging system in accordance with some embodiments.

FIG. 16 shows an alternative arrangement of system hardware 1600 of the frequency-scanned radar imaging system 102. In the arrangement 1600 shown in FIG. 16 the first antenna set is used for transmitting, and the second antenna set is used for receiving. This arrangement 1600 is advantageous for particular high-resolution frequency-scanning radar applications, for example applications that require extended range, which implies higher transmitted power. An example of such an application is unmanned aircraft ("drone") collision avoidance. Further, the arrangement 1600 shown in FIG. 16 is advantageous for producing higher transmitted power because it only requires one power amplifier (PA). This is in contrast to the previously described arrangements which can utilize a plurality of PAs. As only a single PA is used, the PA can be designed to generate high output power without increasing the cost of the design as significantly as if multiple PAs were utilized.

As before, an FPGA is used as the central computing node of the circuit. It controls a DDS unit that generates a plurality of intermediate frequency (IF) signals. These are bandpass filtered to remove digital modulation artifacts, then amplified. The amplified LO signal is distributed to a transmit MIMIC where it is multiplied up to carrier frequency and amplified by the PA. After amplification, the signal leaves the MMIC die and transits to the transmit antenna set, e.g. the first antenna set 302 shown in the arrangement 300 of FIG. 3. The arrangement 1600 can be used to transmit a single waveform out of the frequency-scanned antenna set. The transmitted radiation is radiated out into free space by the transmit antenna set. A portion of this radiation reflects off of a plurality of remote scatterers, returns, and is received by a plurality of independent receive antennas. Each receive antenna is connected to a receive MIMIC which performs mixing and down-conversion, and an ADC which performs digital sampling. The ADCs sample simultaneously, at intervals according to a sample clock which is generated by the FPGA. These ADCs can be implemented as discrete chips, integrated ADC function units located onboard the receive MIMIC die, or a single multichannel ADC chip.

As before, the DDS unit has a trigger signal that connects to the FPGA to indicate when it is stable. In some embodiments there is no trigger signal because the DDS unit is immediately stable, or the FPGA contains calibration data to know when the DDS is stable without closed-loop feedback. As before, when the FPGA receives the trigger signal, it begins generating the ADC sample clock. This clock connects to all ADCs, with either equal-length traces or with a calibrated phase shift to compensate for unequal-length traces. The transmitter transmits a series of waveforms and all ADCs take samples of the received signals reflected from the channel. The receivers are then sampled, e.g. simultaneously. After the sampling process is complete, the FPGA can stop generating the sample clock.

Because the frequency-scanned antenna implements a transformation from radio frequency to spatial angle, the frequency-scanned radar imaging system can simultaneously transmit multiple beams and receive multiple beams if faster data acquisition is desired. This could be implemented in several different ways. For example, this could be implemented by duplicating the frequency synthesis and mixing components. To achieve three beams, the system could contain three DDS units which produce three separate LO signals. On the transmit side, the three separate LO signals could be mixed together before or after up-conversion to carrier frequency. These can be jointly transmit through the selected transmit antenna. On the receive side, each receiving antenna or antenna array can be connected to three receive MMICs, each of which mixes the received signal with one of the pure tone LO signals. Alternatively, the receive circuit can downconvert the received waveforms using a single carrier frequency and sample the resulting signal at a wide enough bandwidth to meet the Nyquist sampling criteria for the entire frequency range of the frequency-scanned antenna. The three signals can then be separated digitally, using for example the discrete Fourier transform.

Figure 17B:
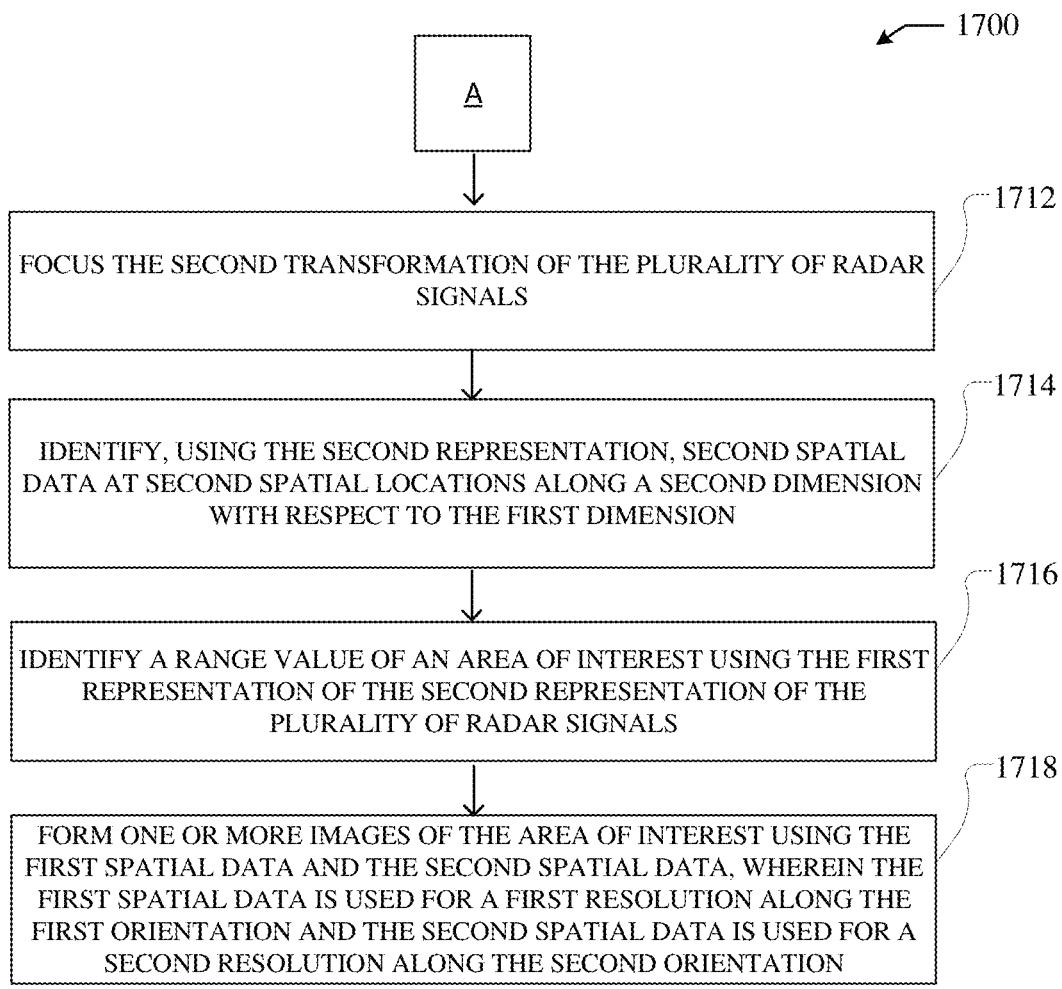

FIGS. 17A and 17B illustrates an example method 1700 for performing frequency-scanned radar imaging. Specifically, the method 1700 shown in FIGS. 17A and 17B can be implemented by the frequency-scanned radar imaging system 102 shown in FIG. 2. The method 1700 shown in FIGS. 17A and 17B is provided by way of example, as there are a variety of ways to carry out the method. Additionally, while the example method 1700 is illustrated with a particular order of steps, those of ordinary skill in the art will appreciate that FIGS. 17A and 17B and the modules shown therein can be executed in any order and can include fewer or more modules than illustrated.

At step 1702, a plurality of radar signals comprising a first and second plurality of radar signals are generated. The plurality of radar signals can have a plurality of unique frequencies within a frequency band. Further, the plurality of radar signals can be generated based one or more reference signals. Specifically, the plurality of radar signals can be generated based on one or more reference signals generated by the signal generator(s) 202. The reference signal(s) can be generated based on range values and resolutions in one or more images of an area of interest. Further, the frequency band and the unique frequencies can be selected based on resolutions in one or more images of the area of interest and unique beam angles of transmitted radar signals used to generate the images.

Next, at step 1704, a first transformation of a first representation of the plurality of radar signals, e.g. at least a portion of the plurality of radar signals, is performed. The first transformation can be performed at a first orientation and physically map the first plurality of radar signals with a plurality of unique beam angles corresponding to the unique frequencies of the corresponding plurality of radar signals. The first transformation can include transmission of the at least the portion of the plurality of radar signals into a channel towards an area of interest. Further, the first transformation can be performed by applicable antenna(s), such as the frequency-scanning antenna(s) 210.

At step 1706, a second transformation of a second portion of the plurality of radar signals, e.g. at least another portion of the plurality of radar signals, is performed. The second transformation can be performed at a second orientation with respect to the first orientation. Specifically, the second transformation can be performed at a second orientation that is orthogonal to the first orientation. Additionally, the second transformation can complement the first transformation. The second transformation can be performed by applicable antenna(s) such as the illumination antenna(s) 212. Additionally, the second transformation can include either transmitting or receiving radar signals, including the at least another portion of the plurality of radar signals.

Next, at step 1708, the first representation, e.g. a first plurality of responses to the first plurality of radar signals, is focused by performing a frequency scan of the plurality of radar signals. The frequency scan can be performed by the frequency-scanning focusing module 216. As part of performing the frequency scan of the first plurality of responses, e.g. the first transformation, the first plurality of responses can be combined to form a first antenna beam. Subsequently, the plurality of unique beam angles formed by the first plurality of radar signals can be identified in the first antenna beam.

At step 1710, first spatial data at first spatial locations along a first dimension can be identified using the first representation of the plurality of radar signals. Specifically, the first spatial data at fist spatial location along a first dimension corresponding to the identified unique beam angles can be determined. The frequency-scanning focusing module 216 can identify the first spatial data at the first spatial location along the first dimension. The first spatial data can be generated by analyzing the first plurality of responses for signal phase shifts, e.g. signal phase shifts corresponding to estimated scattering properties of estimated objects within the area of interest.

Next, at step 1712, the second transformation of the plurality of radar signals is focused. The second plurality of responses, e.g. the second transformation, can be focused by the illumination antenna focusing module 218. The second plurality of responses, e.g. the second transformation, can be focused by gathering digital samples of the second plurality of responses or by forming a digital antenna beam based on the second plurality of responses. Additionally, the second plurality of responses can be focused by forming an analog antenna beam based on the second plurality of responses.

At step 1714, second spatial data at second spatial location along a second dimension can be identified, using the second representation. The second spatial data can be identified along the second dimension that is orthogonal to the first dimension. The second spatial data at the second spatial locations along the second dimension can be identified by illumination antenna focusing module 218. The second spatial data can be identified by estimating scattering properties of the second plurality of responses.

Next, at step 1716, a range value of an area of interest is identified using the first representation or the second representation of the plurality of radar signals. The range value of the area of interest can be identified by the range determination module 220. Further, the range value of the area of interest can be identified by analyzing the first plurality of responses for signal phase shifts, e.g. between the first plurality of radar signals and the first plurality of responses to the first plurality of radar signals.

At step 1718, one or more images of the area of interest are formed using the first spatial data and the second spatial data. The images of the area of interest can be formed by the imaging modules 222. The one or more images can be formed using the first spatial data and the second spatial data. Specifically, the first spatial data can be used to define a first resolution in the one or more images along the corresponding first orientation at which the first transformation of the radar signals is performed. Further, the second spatial data can be used to define a second resolution in the one or more images along the corresponding second orientation at which the second transformation of the radar signals is performed FIG. 18 illustrates an example method 1800 for controlling frequency-scanning as part of performing frequency-scanned radar imaging. Specifically, the method 1800 shown in FIG. 18 can be implemented by the frequency-scanned radar imaging system 102 shown in FIG. 2. The method 1800 shown in FIG. 18 is provided by way of example, as there are a variety of ways to carry out the method. Additionally, while the example method 1800 is illustrated with a particular order of steps, those of ordinary skill in the art will appreciate that FIG. 18 and the modules shown therein can be executed in any order and can include fewer or more modules than illustrated.

At step 1802, pixel parameters of an intended image of the area of interest are identified. The pixel parameters can be identified by the image parameterization module 226. Pixel parameters can be defined based on characteristics of an intended image of the area of interest. For example, if an intended image of an area of interest covers a specific region in space, then the pixel parameters can be defined to cover the region in space. Additionally, pixel parameters can be defined based on characteristics of previous images. Specifically, previous images can be used to identify an area of interest. For example, as will be discussed in greater detail later, edge detection can be used to identify an area of interest that is used to define pixel parameters of an intended image. Further, the area of interest can be defined by a vehicle, if for example the vehicle navigation code had a navigation region in mind that it wanted to verify was empty.

Next, at step 1804, projection angles corresponding to the pixel parameters are identified. The projection angles can be identified by the image parameterization module 226. The projection angles can include angles for transmitting the plurality of radar signals to generate one or more images defined by the pixel parameters through high resolution frequency-shifting radar imaging. More specifically, the projection angles can include projection angles at which the frequency-scanning antenna(s) 210 can transmit radar signals to create one or more images according to the pixel parameters through high resolution frequency-scanning radar.

At step 1806, projection frequencies are gathered based on the projection angles. The image parameterization module 226 can identify the projection frequencies based on the projection angles. Specifically, the image parameterization module 226 can identify the projection frequencies for achieving the projection angles through frequency-scanned radar imaging. Further, the image parameterization module 226 can identify the projection frequencies based on characteristics of antenna(s), e.g. the frequency-scanning antenna(s) used to transmit the radar signals for generating the intended image of the area of interest.

Next, at step 1808, the plurality of unique frequencies for transmitting the radar signals to generate the intended image of the area of interest are selected based on the projection frequencies. The signal frequency selection module 228 can identify the plurality of unique frequencies based on the projection frequencies. Further, the signal frequency selection module 228 can identify the plurality of unique frequencies based on characteristics of antenna(s), e.g. the frequency-scanning antenna(s) used to transmit the radar signals for generating the intended image of the area of interest.

These previous steps can be performed based on the principles of performing frequency-scanning in radar, e.g. through the use of a transmission line of constant length between radiating elements. Specifically and as discussed previously, the frequency-scanning antenna(s) 210 can transmit radar signals at beam angles corresponding to unique frequencies within a frequency band of reference signals used to transmit the radar signals. More specifically, as the input frequencies of the reference signals change, the wavelengths of the reference signals change. Changing the wavelengths of the reference signals, e.g. as the signals pass through a fixed length of transmission line, can change the phase of the reference signals. This phase shift causes the frequency-scanned antenna(s) 210 to transmit a steerable beam of radar signals through frequency-scanning, effectively beamforming the radar signals transmitted by the frequency-scanned antenna(s) 210. Therefore, the unique frequencies can be selected according to these principles to effectively perform beamforming to image the area of interest according to the pixel parameters of the intended image of the area of interest.

At step 1810, instructions are provided to the one or more signals to generate the plurality of radar signals using the plurality of unique frequencies. The signal frequency selection module 228 can form the instructions for generating the plurality of radar signals using the plurality of unique frequencies. Additionally, the signal frequency selection module 228 can provide the instructions to the signal generator(s) 202. The signal generator(s) 202 can generate one or more reference signals based on the plurality of unique frequencies, and the frequency scanning antenna(s) 210 can use the reference signals to transmit the radar signals at the plurality of unique frequencies. This process can repeat itself as the area of interest is continuously imaged or new areas of interest are imaged by the frequency-scanned radar imaging system 102.

The disclosure now proceeds with an overall discussion of performing high resolution imaging of an area of interest using the techniques and systems described herein. In order to collect data for generating images of an area of interest, the frequency-scanned radar imaging system 102 can take a series of measurements that fully define an area of interest. The area of interest is a spatial region located downrange from the frequency-scanned radar imaging system 102. The area of interest can encompass the full field of view of the frequency-scanned radar imaging system 102, or can comprise a subset of the FOV. This is a significant advantage over lidar systems currently used for imaging in intelligent machine applications. Specifically, the frequency-scanned radar imaging system 102 can scan arbitrary volumes within the FOV as opposed to current lidar systems. Further, as the frequency-scanned radar imaging system 102 has few or no moving parts, the area of interest can be scanned quickly. This is in contrast to present lidar designs, which rely on spinning or actuated mirrors.

To implement scanning, first an area of interest is identified. This can be the entire FOV volume, or a particular sub-volume that is of interest. For example, a sub-volume may be defined on the basis of a particular location detected as an object in a prior scan. This object could be further scanned at the same or higher resolution in order to provide additional information, for example for object recognition or tracking.

The frequency-scanned radar imaging system 102 can be mounted on moving platforms, such as ground or airborne vehicles. Accordingly, based on images generated by the frequency-scanned radar imaging system 102 a vehicle can know whether there is a "tunnel of safe passage" ahead which is large enough to accommodate the vehicle. If an obstacle enters the tunnel, as detected through images generated by the frequency-scanned radar imaging system 102, the vehicle can take evasive action, such as turning or stopping.

A key variable to identify whether an object is at risk of entering the tunnel of safe passage is the object's velocity. Specifically, the object's cross-range velocity is key in determining whether an object is at risk of entering the tunnel of sage passage. Current lidar systems have no way to detect velocity of any kind. Further, current radar systems known in the art operate with low resolution and can only detect downrange velocity and not cross-range velocity. The frequency-scanned radar imaging system 102 can also be used to measure downrange velocity to a high degree of accuracy using the Doppler effect, however the more important parameter to identify is the object's cross-range velocity, as cross-range velocity is the basis of whether the object will cross into the path of vehicle.

The frequency-scanned radar imaging system 102 can use edge detection to determine whether an object will pass into a path of a vehicle. Specifically, the frequency-scanned radar imaging system 102 can perform edge detection on the range or downrange velocity image. Edge detection could be performed using applicable techniques, such as the Hough transform. Once edges are detected, areas of interest for the scanning process described below are generated which contain and encompass all detected edges in the FOV. In various embodiments, the entire FOV is not an area of interest, instead only the volumetric areas surrounding all detected edges in the range or velocity image are scanned as the area of interest. This allows the frequency-scanned radar imaging system 102 to track the positions of those edges precisely between subsequent measurements. This has the advantage of eliminating the computationally intensive image registration, dense motion estimation, or stereo matching steps that would be required to search for changes in cross-range position from a computer vision or lidar image. Furthermore trying to derive cross-range velocity from such methods is extremely noisy. A cross-range velocity estimation taken from two computer vision or lidar images is a mathematical derivative on noisy data. Further, such a velocity estimation would itself be even more noisy, and would require additional filtering, e.g. using a Kalman filter.

The frequency-scanned radar imaging system 102 can eliminate these problems and is capable of taking smoother, more accurate cross-range velocity measurements, when compared to current lidar and computer vision systems, by only measuring the areas of interest around the detected edges in the image. This can effectively eliminate needs to perform image registration, dense motion estimation, or stereo matching because there is no need to guess what edges correspond to each other in different image frames. Instead, the frequency-scanned radar imaging system 102 can measure this directly by returning to the same search volume quickly enough that the edge cannot leave in a realistic mechanical timescale. In turn, this provides a smooth cross-range motion estimate that is suitable for making vehicle navigation decisions.

This is similar to how track filtering works. Track filtering estimates the track of a known target based on a series of measurements by combining several successive measurements to form a longer-term picture. In our case, the targets we are applying track filtering to are edges, e.g. discontinuities in range or Doppler shift (downrange velocity) detected from a full-scene scan.

Figure 19A:
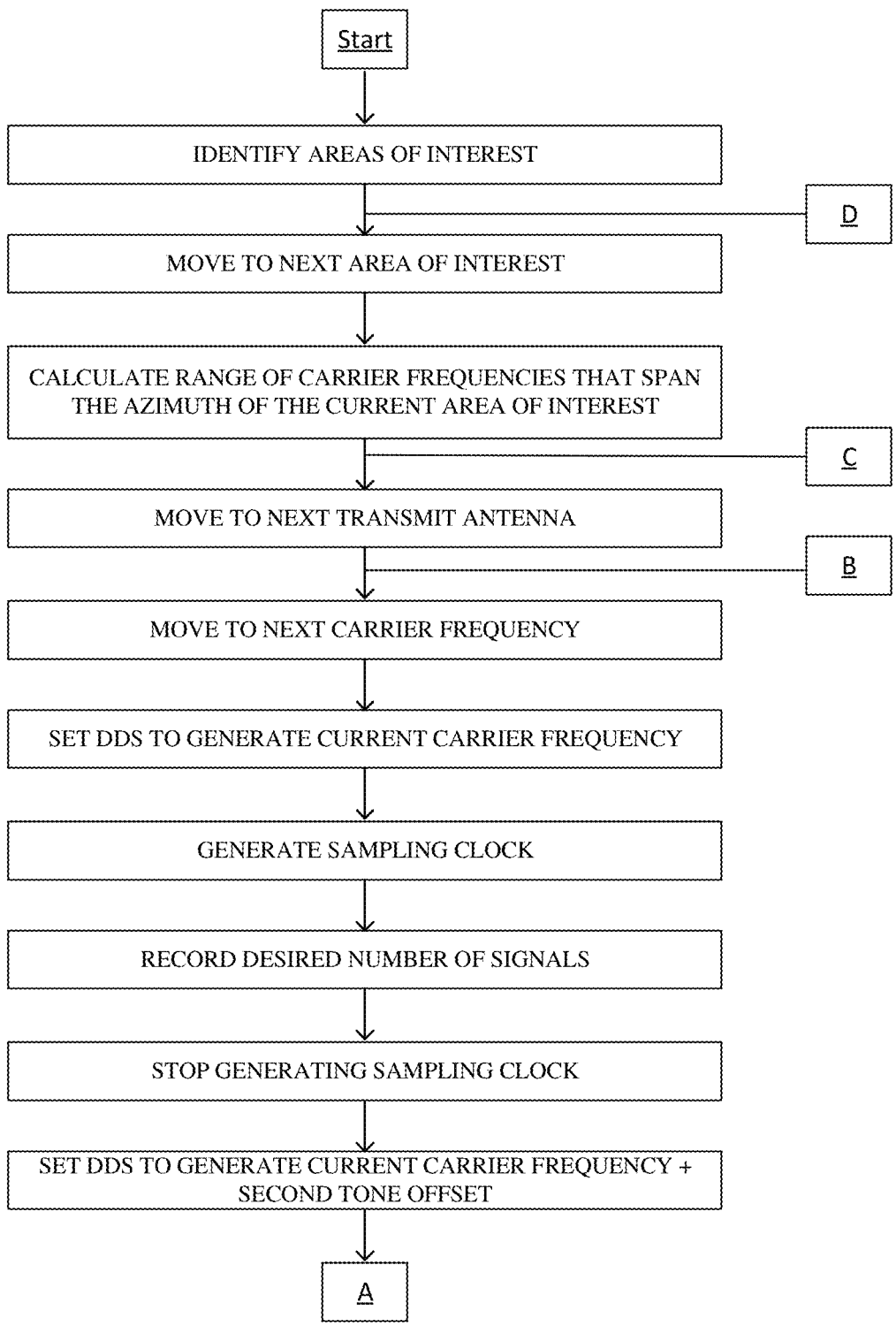
FIGS. 19A and 19B show a flow of an example MIMO scanning process for performing high resolution frequency-scanned radar imaging in accordance with some embodiments.
Figure 19B:
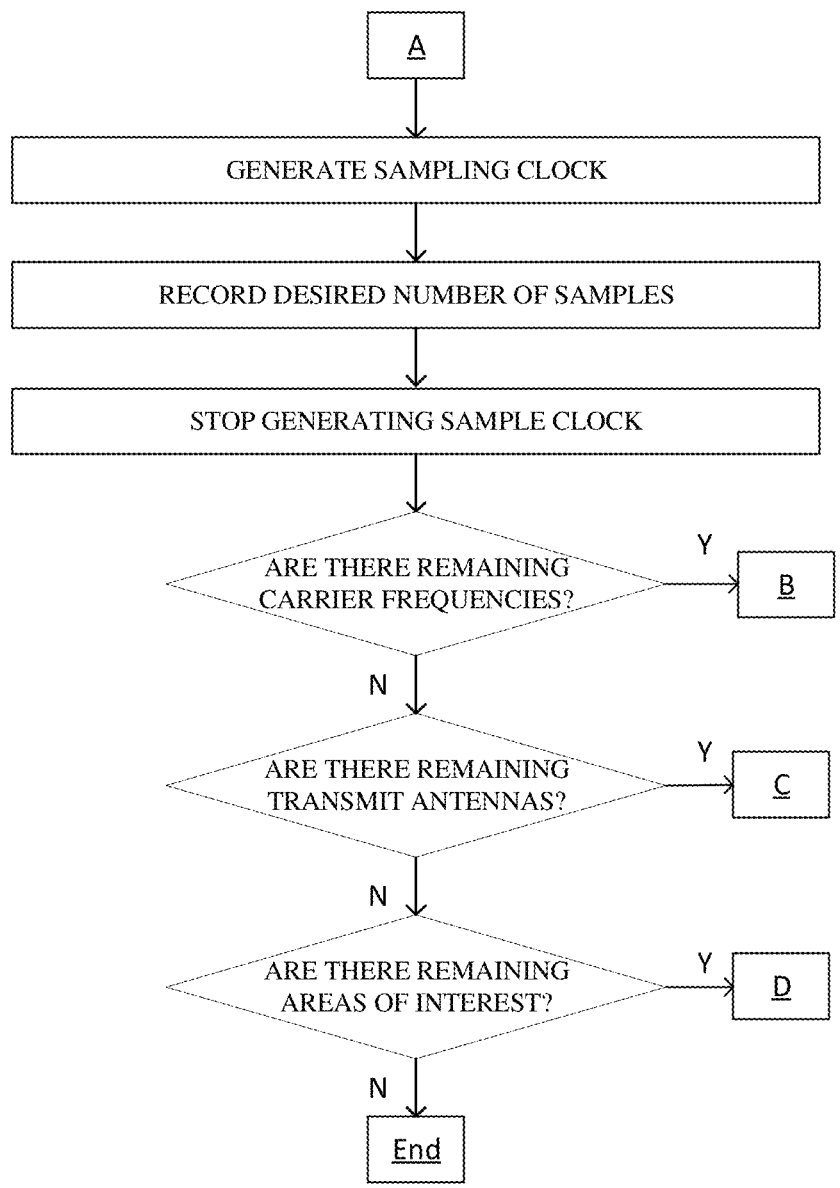

Once areas of interest are identified, the scanning process proceeds. FIGS. 19A and 19B show a flow 1900 of an example MIMO scanning process for performing high resolution frequency-scanned radar imaging. The MIMO scanning process can be implemented using the antenna arrangement 300 shown in FIG. 3. In this configuration, the first antenna set 302 is configured to receive, and the second antenna set 304 is configured to transmit as a series of independent antennas with time multiplexing. The process begins by designating a series of areas of interest. These are derived using one of the methods described previously. Next, the system loops over the areas of interest. For each, it calculates the range of carrier frequencies that correspond to the left and right-most extent of the area of interest in azimuth. Recall that the frequency-scanned antenna array performs a mapping from carrier frequency to azimuth angle. Hence for any region in space, the left and right extent of the region represent different azimuth angles and hence a range of carrier frequencies from $f_{min}$ to $f_{max}$.

The beamwidth of the frequency scanned antenna in the horizontal direction defines the horizontal resolution $\theta_3$ of the frequency-scanned radar imaging system 102. The frequency-scanned radar imaging system 102 is designed to record data at the highest possible resolution. Therefore, the carrier frequency can be stepped at a frequency that shifts the beam no more than $\theta_3$. This frequency can be defined as $\Delta f$. To scan the current area of interest, the frequency-scanned radar imaging system 102 constructs a list of scanning frequencies from $f_{min}$ to $f_{max}$ in steps of $\Delta f$. Each transmit antenna can transmit every frequency in this list. Next, the LO switch matrix is switched to the first transmit antenna. The DDS unit is configured to generate the LO frequency corresponding to the first carrier frequency. Then the sampling process proceeds. Specifically, the FPGA waits for the DDS to stabilize, then activates the sampling clock, records the desired number of samples, and deactivates the sampling clock.

As discussed previously, the frequency-scanned radar imaging system 102 uses phase measurements to determine range. In order to solve the phase ambiguity problem, the frequency-scanned radar imaging system 102 can transmit two frequencies and look at the difference in phase between them. The offset between these two frequencies can be 1 MHz. The next step of the scanning process is to transmit this second frequency. The DDS is configured to generate the LO frequency corresponding to the current carrier frequency plus the phase measurement offset, for example 1 MHz. After the sampling process is complete, the frequency-scanned radar imaging system 102 has taken two measurements and hence has enough data to take an unambiguous phase measurement at this azimuth.

After the second frequency is measured in the current frequency bin, the DDS is configured to generate the LO frequency corresponding to the next carrier frequency in the list, and the sampling process runs again. Then the DDS is configured to generate that frequency plus the phase measurement offset, and the sampling process runs again. This process repeats until all frequencies in the list spanning the area of interest have been measured twice.

Next, the LO Switch Matrix is switched to the next transmit antenna, and a two-frequency unambiguous phase measurement is made from each frequency in the list spanning the area of interest using this transmit antenna. This process is repeated until every transmit antenna has transmitted all frequencies. At this point, the frequency-scanned radar imaging system 102 has a complete set of phase measurements for all frequencies spanning the area of interest, from every transmit antenna. At this point, the data can be used to reconstruct a 3D image of this area of interest. If there is more than one area of interest in an image, the system switches to the next area of interest, calculates the range of frequencies that span it, and the scanning process runs again. This procedure runs until a full dataset has been captured for every area of interest.

After the completion of the scanning process described above, the memory in the FPGA contains a complete set of digital samples for one or more areas of interest (AOAs). This set of digital samples consists of complex samples of recorded scattering waveforms at a plurality of frequencies that represent a scan in angle across the azimuthal extent of each AOA, transmitted from each of a plurality of transmitting antennas.

The purpose of the imaging step is to interpret these signals to produce an image that estimates the scattering properties of the channel. Specifically, the frequency-scanned radar imaging system 102 can identify the nature of the energy that was scattered from each 3D voxel position in a given image volume. As described before, a signal leaves the transmit antenna, propagates through space, and comes into contact with one or more scatterers. Each scatterer reflects back a portion of the incident wave. These reflections are received by receive antennas, e.g. all receive antennas. In the present it can be assumes that the channel from transmitter to receiver is linear. Specifically, it can be assumed that that the actions of each scatterer obey the principle of superposition. This principle states that the net response of multiple scatterers is the sum of the response of each scatterer individually. This assumption, known from optics as the "Born approximation" is sufficiently accurate for the purpose of the frequency-scanned radar imaging system 102. Furthermore, because the system is linear it can be characterized by its impulse response. In the imaging context the impulse response is the response of the system to a single isotropic point scatterer—this is known as the "point spread response" (PSR).

Most objects that that the frequency-scanned radar imaging system 102 is designed to image consist of large surfaces that produce diffuse reflections. Diffuse reflections scatter radiation in all directions, as opposed to specular reflections which scatter radiation in one predominant direction only. If superposition holds, this means that a surface producing diffuse reflections produces a scattering response that is an integral over the surface, where the integration operation assumes the surface is made up of an infinite-number of infinitesimally-small individual scatterers. To calculate an image, the frequency-scanned radar imaging system 102 can identify how much energy was scattered from a particular voxel position in space. By looping over all voxels, the frequency-scanned radar imaging system 102 can create a 3D point cloud of the imaged volume.

To find the energy that was scattered from a particular voxel position, the frequency-scanned radar imaging system 102 can find the sum of all energy that was scattered by that point, contained across the whole set of complex measurements sitting in the FPGA's memory. Each measurement consists of one combination of frequency and transmitter-receiver pair. As the frequency-scanned radar imaging system 102 sums the contributions from more and more measurements, more information is incorporated into the final image, sharpening it in a way that can be thought of as bringing the point scatterer at that position (if it exists) "into focus".

Figure 20:
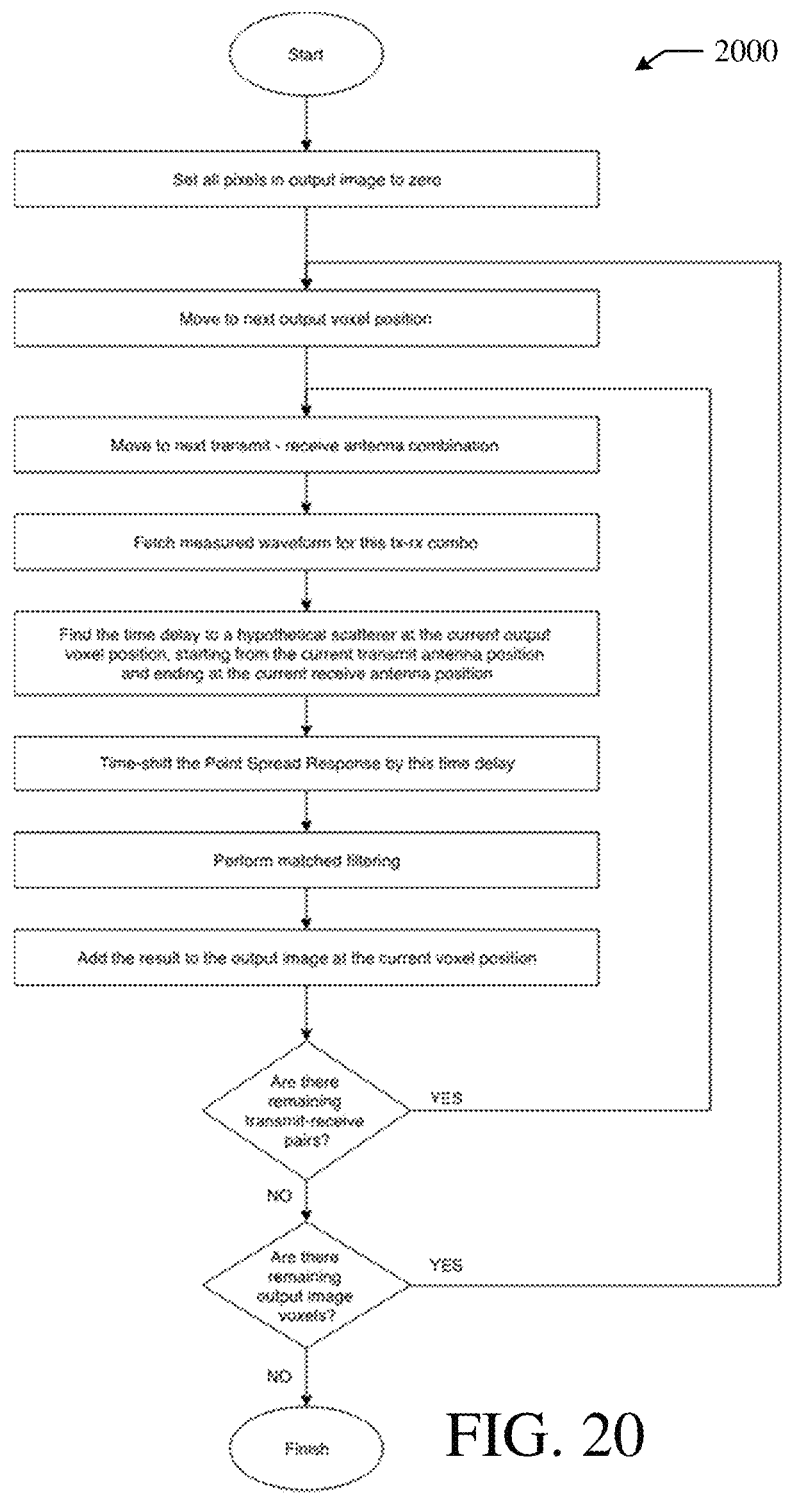
FIG. 20 shows a flow of an example matched filtering imaging process for performing high resolution frequency-scanned radar imaging in accordance with some embodiments.

One way to implement the image formation process is with matched filtering. FIG. 20 shows a flow 2000 of an example matched filtering imaging process for performing high resolution frequency-scanned radar imaging. Matched filtering looks for the presence of a template signal in an unknown signal, and is the optimal linear filter for maximizing the SNR if the template signal is deterministic and known. The system is linear and characterized by the point spread response, which (once measured) is a known deterministic signal. Therefore, the frequency-scanned radar imaging system 102 can use matched filtering to search the measured data for the presence of the point spread response that is expected to be received from a given voxel position. Since the frequency-scanned radar imaging system 102 searches all complex measurements for the energy from a particular voxel position, performing matched filtering with the expected PSR from that point in space and summing the responses gives the total energy scattered from that point.

The image starts with an empty point cloud with all values set to zero. The frequency-scanned radar imaging system 102 then loops over all output pixel positions. For each output pixel, the frequency-scanned radar imaging system 102 loops over all recorded waveforms. Each waveform is the recorded response of one receive antenna to a waveform transmitted from one transmit antenna. The frequency-scanned radar imaging system 102 knows the positions of these transmit and antennas in space. Therefore, for each recorded waveform, the frequency-scanned radar imaging system 102 calculates the distance from the transmit antenna to the current voxel position and back to the current receive antenna position. The frequency-scanned radar imaging system 102 then time-shifts the PSR to create the template signal. The frequency-scanned radar imaging system 102 then performs matched filtering of the current recorded waveform with this template signal. Finally, the matched filter output is added to the value at the current voxel position. If there are more recorded waveforms from more transmit-receive pairs, the loop then continues to the next transmit-receive pair. If all transmit-receive pairs have been processed, the loop then continues to the next voxel position in the output image. If all voxel positions have been processed, the process is complete.

As the frequency-scanned radar imaging system 102 loops over the recorded waveforms from transmit-receive pairs, each summation results in enhanced resolution about the point of interest, resulting in a "sharpening" or "focusing" process. If it is desirable to perform more efficient computation of lower-resolution images to conserve computational resources, this process can allow the resolution or focus to be parameterized, much like turning the focus ring on a camera lens. By turning the ring to a "blurry" setting, images can be produced more quickly, which may be advantageous in some scenarios.

After looping over all transmit-receive pairs, the outer loop continues by moving to a new voxel, and the process is repeated at that voxel. As this loop runs, a 3D volume of intensity values is generated, representing the scattering action that took place downrange.

The disclosure now continues with a discussion of calibration. There are a variety of sources of error that can arise during the manufacturing, installation, and operation of the frequency-scanned radar imaging system 102. If any of these errors are significant enough to introduce errors into the imaging operation, they can be measured and corrected for by performing calibration. In general, the errors in the frequency-scanned radar imaging system 102 arise from a variety of causes but all result in the same two effects, an unwanted amplitude offset between transmit-receive antenna pairs, or an unwanted phase offset between transmit-receive antenna pairs.

Amplitude and phase errors are introduced in a variety of ways. First, amplifier gains vary as a function of temperature. Additionally, signal path losses vary as a function of temperature. Further, antenna manufacturing tolerances produce errors in antenna size, shape, and position. Further, additional gain and phase offsets occur due to the different signal path lengths of different channels due to circuit routing constraints. Additionally, the array geometry may have static errors due to mechanical tolerances introduced in manufacturing or installation in the target platform, e.g. a vehicle. Finally, the array geometry may have dynamic errors introduced by the vibration of the target platform.

Some of these sources of error are relatively constant over the life of the frequency-scanned radar imaging system 102. For example, phase and amplitude errors resulting from different signal path lengths are constant over the life of the frequency-scanned radar imaging system 102. The length of printed circuit board signal path traces will have initial error due to manufacturing tolerances, but will not change. Other sources of error, such as temperature-dependent amplifier gains or array deformation due to target platform vibration, vary during the operation of the device. The frequency-scanned radar imaging system 102 can implement a calibration procedure that accounts for both the long-term stable and short-term dynamic sources of error.

The image formation process described above can be implemented using the backpropagation method. As explained above, this technique relies on summing the signals contributed from each transmit-receive pair in phase. The frequency-scanned radar imaging system 102 can be designed to operate with a carrier frequency of 76-77 GHz. This corresponds to a wavelength of 4 mm. Thus, a one degree phase offset corresponds to 11 micrometers. The calibration technique described herein is designed to compensate for phase errors to give a resulting accuracy on the order of 1 degree.

An additional source of error is unwanted direct coupling between transmit and receive antennas. The frequency-scanned radar imaging system 102 can use an antenna array with closely-spaced antenna elements. Therefore, direct coupling between transmit and receive produces a very short signal path. Further, the frequency-scanned radar imaging system 102 can use frequency-modulated continuous wave (FMCW) modulation for ranging, thereby leading to a short signal path resulting in an intermediate frequency (IF) signal with a lower frequency after demodulation. Because these cross-coupled signal paths are so much shorter than the normal operating range of the frequency-scanned radar imaging system 102, they can produce IF signals at a much lower frequency than the desired round trip signal paths. These frequencies can be effectively filtered out using linear filters. The frequency-scanned radar imaging system 102 can implement this filtering using either or both analog circuit elements before digitization and a digital filter after sampling.

Because all of the sources of error described above result in an unwanted per-channel amplitude or phase offset, the error is a linear operation applied to received signals and can be quantified in a square matrix. This is the error matrix. If the frequency-scanned radar imaging system 102 contains $N_{Tx}$ transmitters and $N_{Rx}$ receivers, this is a square matrix with $N_{Tx} \times N_{Rx}$ entries. The values in the matrix are complex numbers so they can describe both an amplitude and a phase error. The diagonal of this matrix models the gain and phase offsets of a single Tx-Rx signal path, with regard to a constant reference. If, for example the path from transmitter #1 to receiver #1 is taken as the reference, then the cell in the matrix for Tx 1-Rx 1 ("channel 1") has the value 1, and the value of all other cells along the diagonal of the matrix contain the values of amplitude and phase offset relative to channel 1.

Off-diagonal cells in the error matrix correspond to the effects of antenna coupling between channels. It can be assumed that antenna cross-coupling is negligible due to filtering out low-frequency IF signals. Thus it can be assumed that the error matrix is diagonal. Therefore, one goal of the calibration process is to take measurements to obtain this diagonal error matrix. The error matrix can be measured by scanning a known reference target within the frequency-scanned radar imaging system 102 field of view. For example, a sensor mounted on a car could have a view of the hood, and there could be a fixed reference target placed there. The error matrix can be obtained by measuring the amplitude and phases of the reference target, which is located at a known position. The actual signals from all transmit to receive channels are compared to the signals that would be expected from an array with no errors, imaging at target at the known reference position. The per-channel differences between the amplitudes and the phases of the measured and expected waves form the diagonal entries of the error matrix.

In another embodiment, the frequency-scanned radar imaging system 102 does not use a reference target at a known position to perform calibration. Instead, a target is chosen at an unknown position in the field of view. First, an imaging technique is performed with an uncalibrated array or using the last known good calibration. Next, a target is chosen from that image. This target could be chosen by locating the voxels with the highest-intensity reflection, voxels at a particularly favorable distance, or voxels that have a desirable amount of contrast with neighboring voxels. Finally, an optimization process is run. This optimization solves for the error matrix that produces the smallest, sharpest image of the selected target. An applicable optimization technique can be utilized, such as least squares optimization.

Once the frequency-scanned radar imaging system 102 has the error matrix, the frequency-scanned radar imaging system 102 can apply the error matrix to correct the recorded waveform. The input to the image formation technique described earlier can be the sampled waveform from each transmit to receive signal path. The error matrix diagonal contains an entry for each of these signal paths, so the frequency-scanned radar imaging system 102 can simply apply the amplitude and phase offset from that entry to the sampled signal to produce a corrected signal. The corrected signals from all channels can then be fed into the imaging technique and backpropagation is run as described before.

Several components described in this paper, including clients, servers, and engines, may be compatible with or implemented using a cloud-based computing system. As used in this paper, a cloud-based computing system is a system that provides computing resources, software, and/or information to client devices by maintaining centralized services and resources that the client devices may access over a communication interface, such as a network. The cloud-based computing system may involve a subscription for services or use a utility pricing model. Users may access the protocols of the cloud-based computing system through a web browser or other container application located on their client device.

This paper describes techniques that those of skill in the art may implement in numerous ways. For instance, those of skill in the art may implement the techniques described in this paper using a process, an apparatus, a system, a composition of matter, a computer program product embodied on a computer-readable storage medium, and/or a processor, such as a processor configured to execute instructions stored on and/or provided by a memory coupled to the processor. Unless stated otherwise, a component such as a processor or a memory described as being configured to perform a task may be implemented as a general component that is configured to perform the task at a given time or a specific component that is manufactured to perform the task. As used in this paper, the term 'processor' refers to one or more devices, circuits, and/or processing cores configured to process data, such as computer program instructions.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of refers to at least one of a set and indicates that one member of the set or multiple members of the set satisfy the claim. For example, claim language reciting "at least one of A and B" means A, B, or A and B.

What is claimed is:

1. A frequency-scanned radar imaging system comprising:
one or more signal generators configured to generate a plurality of radar signals, each of the plurality of radar signals being based on one or more reference signals and having one of a plurality of unique frequencies within a frequency band;
first one or more antennas oriented in a first orientation toward an area of interest and configured to perform a first transformation of a first representation of the plurality of radar signals, the first transformation physically mapping the plurality of radar signals with a plurality of unique beam angles corresponding to the plurality of unique frequencies;
second one or more antennas oriented in a second orientation toward the area of interest, the second orientation orthogonal to the first orientation and configured to perform a second transformation of a second representation of the plurality of radar signals, the second transformation complementing the first transformation;
a first focusing module configured to focus the first representation of the radar signals by performing a frequency scan of the plurality of radar signals, and to identify, using the first representation, first spatial data at first spatial locations along a first dimension corresponding to the plurality of unique beam angles;
a second focusing module configured to focus a second representation of the plurality of radar signals and to identify, using the second representation, second spatial data at second spatial locations along a second dimension distinct from the first dimension;
a range determination module configured to identify a range value of the area of interest using the first representation or the second representation of the plurality of radar signals;
an image formation module configured to form one or more images of the area of interest using the first spatial data for a first resolution along the first orientation and the second spatial data for a second resolution along the second orientation.

2. The frequency-scanned radar imaging system of claim 1, wherein the frequency scan comprises:
forming a first antenna beam with the plurality of radar signals;
identifying in the first antenna beam the plurality of unique beam angles.

3. The frequency-scanned radar imaging system of claim 1, wherein the first focusing module is configured to identify the first spatial data using signal phase shifts associated with the plurality of radar signals.

4. The frequency-scanned radar imaging system of claim 1, wherein:
the first focusing module is configured to identify the first spatial data using signal phase shifts associated with the plurality of radar signals;
the image formation module is configured to estimate scattering properties of estimated objects within the area of interest using the signal phase shifts.

5. The frequency-scanned radar imaging system of claim 1, wherein:
the first representation or the second representation of radar signals comprises a plurality of responses to the plurality of radar signals;
the second focusing module is configured to focus the plurality of responses by gathering digital samples of the plurality of responses;
the second focusing module is configured to identify the second spatial data by estimating scattering properties of the plurality of responses using the digital samples of the plurality of responses.

6. The frequency-scanned radar imaging system of claim 1, wherein:
the first representation or the second representation of radar signals comprises a plurality of responses to the plurality of radar signals;
the second focusing module is configured to focus the plurality of responses by forming a digital antenna beam based on the plurality of responses;
the second focusing module is configured to identify the second spatial data by analyzing the digital antenna beam for one or more scattering properties.

7. The frequency-scanned radar imaging system of claim 1, wherein:
the first representation or the second representation of radar signals comprises a plurality of responses to the plurality of radar signals;
the second focusing module is configured to focus the plurality of responses by forming an analog antenna beam based on the plurality of responses;
the second focusing module is configured to identify the second spatial data by analyzing the analog antenna beam for one or more scattering properties.

8. The frequency-scanned radar imaging system of claim 1, wherein:
the first representation or the second representation of radar signals comprises a plurality of responses to the plurality of radar signals;
the second focusing module is configured to focus the plurality of responses by analyzing delay properties of the plurality of responses.

9. The frequency-scanned radar imaging system of claim 1, wherein:
the first representation or the second representation of radar signals comprises a plurality of responses to the plurality of radar signals;
the second focusing module is configured to identify the second spatial data by analyzing the plurality of responses for signal phase shifts corresponding to estimated scattering properties of estimated objects within the area of interest.

10. The frequency-scanned radar imaging system of claim 1, wherein:
the first representation or the second representation of radar signals comprises a plurality of responses to the plurality of radar signals;
the range determination module is configured to identify the range value by analyzing the plurality of responses for signal phase shifts.

11. The frequency-scanned radar imaging system of claim 1, wherein the one or more images comprise three-dimensional images comprising individual voxels, the individual voxels including a planar portion formed from the first and second spatial data, the planar portion being normal to a direction of the range value.

12. The frequency-scanned radar imaging system of claim 1, wherein:
the one or more images comprise three-dimensional images comprising individual voxels, the individual voxels including one or more planar portions formed from the first and second spatial data and normal to a direction of the range value;
the individual voxels include spatial range data corresponding to the range value.

13. The frequency-scanned radar imaging system of claim 1, wherein:
the first transformation comprises a transmission of the first representation of the plurality of radar signals;
the second transformation comprises a reception of the second representation of the plurality of radar signals.

14. The frequency-scanned radar imaging system of claim 1, wherein:
the first transformation comprises a reception of the first representation of the plurality of radar signals;
the second transformation comprises a transmission of the second representation of the plurality of radar signals.

15. The frequency-scanned radar imaging system of claim 1, wherein the area of interest corresponds to a field of view of a vehicle.

16. The frequency-scanned radar imaging system of claim 1, wherein the frequency band comprises:
an automotive radar frequency band;
a narrow band frequency range;
a narrow band frequency range including one of 6.765 Megahertz (MHz)-6.795 MHz, 13.553 MHz-13.567 MHz, 26.957 MHz-27.283 MHz, 40.66 MHz-40.7 MHz, 433.05 MHz-434.79 MHz, 902 MHz-928 MHz, 2.4 Gigahertz (GHz)-2.5 GHz, 5.725 GHz-5.875 GHz, 24 GHz-24.25 GHz, 61 GHz-61.5 GHz, 122 GHz-123 GHz, 244 GHz-246 GHz; or
a commercial, military, or industrial radio frequency band.

17. The frequency-scanned radar imaging system of claim 1, wherein the frequency band is selected to correspond to the first resolution.

18. The frequency-scanned radar imaging system of claim 1, wherein:
the first one or more antennas comprise transmitting antennas to transmit the plurality of radar signals and the second one or more antennas comprise receiving antennas to receive the plurality of radar signals; or
the first one or more antennas comprise receiving antennas to receive the plurality of radar signals, and the second one or more antennas comprise transmitting antennas to transmit the plurality of radar signals.

19. The frequency-scanned radar imaging system of claim 1, wherein the first and second one or more antennas are implemented remote from each other.

20. The frequency-scanned radar imaging system of claim 1, wherein the second one or more antennas:
use one or more of time-division multiplexing (TDM), frequency-division multiplexing (FDM), and orthogonal frequency-divisional multiple multiplexing (OFDM); or
comprise one or more of time-shifted antennas arrays, frequency shifted antennas arrays, and phase shifted antennas arrays.

21. The frequency-scanned radar imaging system of claim 1, wherein: the first one or more antennas comprises:
at least one antenna of a first polarization;
at least one antenna of a second polarization orthogonal to the first polarization;
the first focusing module is configured to gather polarization data associated with the first representation of the plurality of radar signals, the polarization data corresponding to one or more objects in the area of interest;
the image formation module is configured to determine a material property of the one or more objects using the polarization data.

22. The frequency-scanned radar imaging system of claim 1, wherein the first orientation is a horizontal direction corresponding to an azimuthal measurement and the second orientation is a vertical direction corresponding to an elevation measurement.

23. The frequency-scanned radar imaging system of claim 1, wherein the first orientation is a vertical direction corresponding to an elevation measurement and the second orientation is a horizontal direction corresponding to an azimuthal measurement.

24. The frequency-scanned radar imaging system of claim 1, wherein the first one or more antennas comprises:
a slot array of antennas;
a slot array of antenna elements fed by a serpentine waveguide oriented orthogonal to the first orientation;
a horn antenna;
an array of antenna elements, the antenna elements each having directed radiation characteristics;
a microstrip antenna;
a leaky wave antenna;
a leaky wave antenna implemented as a waveguide having a slit configured to perform the first transformation; or
a leaky wave antenna implemented as a periodic dielectric structure or a microstrip patterned on a printed circuit board (PCB).

25. The frequency-scanned radar imaging system of claim 1, wherein the second focusing module is configured to form a virtual antenna array with the second representation of the plurality of radar signals.

26. The frequency-scanned radar imaging system of claim 1, wherein one or more of the first one or more antennas or one or more of the second one or more antennas are coupled to a Monolithic Microwave Integrated Circuit (MMIC).

27. The frequency-scanned radar imaging system of claim 1, further comprising:
one or more first Monolithic Microwave Integrated Circuits (MMICs) coupled to the first one or more antennas and configured to process the first transformation;
one or more second MMICs coupled to the second one or more antennas and configured to process the second transformation.

28. The frequency-scanned radar imaging system of claim 1, wherein:
the first representation of the plurality of radar signals comprises the plurality of radar signals, and the second representation of the plurality of radar signals comprises a first plurality of responses to of the plurality of radar signals.

29. The frequency-scanned radar imaging system of claim 1, wherein:
the first representation of the plurality of radar signals comprises a second plurality of responses to the plurality of radar signals, and the second representation of the plurality of radar signals comprises the plurality of radar signals.

30. A method for performing frequency-scanned radar imaging comprising:
generating a plurality of radar signals, each of the plurality of radar signals being based on one or more reference signals and having one of a plurality of unique frequencies within a frequency band;

performing a first transformation of a first representation of the plurality of radar signals at a first orientation, the first transformation physically mapping the plurality of radar signals with a plurality of unique beam angles corresponding to the plurality of unique frequencies;

performing a second transformation of a second representation of the plurality of radar signals at a second orientation, the second transformation complementing the first transformation, the second orientation orthogonal to the first orientation;

focusing the first representation of the plurality of radar signals by performing a frequency scan of the plurality of radar signals;

identifying, using the first representation, first spatial data at first spatial locations along a first dimension corresponding to the plurality of unique beam angles;

focusing a second representation of the plurality of radar signals;

identifying, using the second representation, second spatial data at second spatial locations along a second dimension distinct from the first dimension;

identifying a range value of the area of interest using the first representation or the second representation of the plurality of radar signals;

forming one or more images of the area of interest using the first spatial data for a first resolution along the first orientation and the second spatial data for a second resolution along the second orientation.

31. A frequency-scanned radar imaging system comprising:

one or more signal generators configured to generate a plurality of radar signals, each of the plurality of radar signals being based on one or more reference signals and having one of a plurality of unique frequencies within a frequency band;

first one or more antennas oriented in a first orientation toward an area of interest and configured to perform a first transformation of a first representation of the plurality of radar signals, the first transformation physically mapping the plurality of radar signals with a plurality of unique beam angles corresponding to the plurality of unique frequencies;

second one or more antennas oriented in a second orientation toward the area of interest, the second orientation orthogonal to the first orientation and configured to perform a second transformation of a second representation of the plurality of radar signals, the second transformation complementing the first transformation;

one or more first Monolithic Microwave Integrated Circuits (MMICs) coupled to the first one or more antennas and configured to process the first transformation;

one or more second MMICs coupled to the second one or more antennas and configured to process the second transformation;

a first focusing module configured to focus the first representation of the plurality of radar signals by performing a frequency scan of the plurality of radar signals, and to identify, using the first representation, first spatial data at first spatial locations along a first dimension corresponding to the plurality of unique beam angles;

a second focusing module configured to focus a second representation of the plurality of radar signals and to identify, using the second representation, second spatial data at second spatial locations along a second dimension distinct from the first dimension;

a range determination module configured to identify a range value of the area of interest using the first representation or the second representation of the plurality of radar signals;

an image formation module configured to form one or more images of the area of interest using the first spatial data for a first resolution along the first orientation and the second spatial data for a second resolution along the second orientation;

wherein the frequency band is selected to correspond to the first resolution;

wherein the one or more images comprise three-dimensional images comprising individual voxels, the individual voxels including a planar portion formed from the first and second spatial data, the planar portion being normal to a direction of the range value.

* * * * *